US005479605A

United States Patent [19]

Saitoh

[11] Patent Number: 5,479,605

[45] Date of Patent: Dec. 26, 1995

[54] RASTER OPERATION APPARATUS FOR EXECUTING A DRAWING ARITHMETIC OPERATION WHEN WINDOWS ARE DISPLAYED

[75] Inventor: Hideki Saitoh, Kawasaki, Japan

[73] Assignee: Fujitsu Limited, Kawasaki, Japan

[21] Appl. No.: 125,743

[22] Filed: Sep. 24, 1993

[30] Foreign Application Priority Data

Sep. 28, 1992 [JP] Japan .................................. 4-257956

[51] Int. Cl.[6] .................................................. G06F 12/00

[52] U.S. Cl. ........................................... 395/164; 395/162

[58] Field of Search .................................. 395/119, 121, 395/122, 125, 127, 133, 157, 162–166, 425; 345/22, 24, 27, 28, 185–187, 197, 191, 203, 189; 365/189.12

[56] References Cited

U.S. PATENT DOCUMENTS 4,752,893 6/1988 Guttag et al. ........................... 395/166

4,845,656 7/1989 Nishibe et al. ........................ 395/166

*Primary Examiner*—Mark R. Powell
*Assistant Examiner*—Kee M. Tung
*Attorney, Agent, or Firm*—Staas & Halsey

[57] ABSTRACT

When windows are synthesized or the like in different frame memories or in the same frame memory, source data on the shifting side and destination data on the shift destination side are read out. After the source data was shifted so as to match the data positions, a bit arithmetic operation is executed between the shifted source data and the destination data. Four source data registers, two destination registers, and two bit operating sections are provided. The source data stored in a certain source register is shifted and a bit arithmetic operation is executed between the shifted source data and the destination data. In parallel with the bit arithmetic operation, the source data to be processed next is read out from the frame memory and stored into the source register. No idling state occurs in the memory access of the source data.

16 Claims, 24 Drawing Sheets

FIG. 23

| FIRST SHIFTER SECTION CONTROL SIGNAL | SECOND SHIFTER SECTION CONTROL SIGNAL | SHIFT AMOUNT |
|---|---|---|
| B0 | B00 | 0 |
| | B04 | 4 |
| | B08 | 8 |
| | B12 | 12 |
| B1 | B00 | 1 |
| | B04 | 5 |
| | B08 | 9 |
| | B12 | 13 |
| B2 | B00 | 2 |
| | B04 | 6 |
| | B08 | 10 |
| | B12 | 14 |
| B3 | B00 | 3 |
| | B04 | 7 |
| | B08 | 11 |
| | B12 | 15 |

FIG. 24

| Shift amount | A3 | A2 | A1 | A0 | 63 bits | | | | | | | | | | 00 bit |
|---|---|---|---|---|---|---|---|---|---|---|---|---|---|---|---|
| 0 | 0 | 0 | 0 | 0 | 63 62 61 60 | 59 58 57 56 | 55 54 53 52 | 51 50 49 48 | 47 46 | · · · · · | 17 16 | 15 14 13 12 | 11 10 09 08 | 07 06 05 04 | 03 02 01 00 |
| 1 | 0 | 0 | 0 | 1 | 00 63 62 61 | 60 59 58 57 | 56 55 54 53 | 52 51 50 49 | 48 47 | · · · · · | 18 17 | 16 15 14 13 | 12 11 10 09 | 08 07 06 05 | 04 03 02 01 |
| 2 | 0 | 0 | 1 | 0 | 01 00 63 62 | 61 60 59 58 | 57 56 55 54 | 53 52 51 50 | 49 48 | · · · · · | 19 18 | 17 16 15 14 | 13 12 11 10 | 09 08 07 06 | 05 04 03 02 |
| 3 | 0 | 0 | 1 | 1 | 02 01 00 63 | 62 61 60 59 | 58 57 56 55 | 54 53 52 51 | 50 49 | · · · · · | 20 19 | 18 17 16 15 | 14 13 12 11 | 10 09 08 07 | 06 05 04 03 |
| 4 | 0 | 1 | 0 | 0 | 03 02 01 00 | 63 62 61 60 | 59 58 57 56 | 55 54 53 52 | 51 50 | · · · · · | 21 20 | 19 18 17 16 | 15 14 13 12 | 11 10 09 08 | 07 06 05 04 |
| 5 | 0 | 1 | 0 | 1 | 04 03 02 01 | 00 63 62 61 | 60 59 58 57 | 56 55 54 53 | 52 51 | · · · · · | 22 21 | 20 19 18 17 | 16 15 14 13 | 12 11 10 09 | 08 07 06 05 |
| 6 | 0 | 1 | 1 | 0 | 05 04 03 02 | 01 00 63 62 | 61 60 59 58 | 57 56 55 54 | 53 52 | · · · · · | 23 22 | 21 20 19 18 | 17 16 15 14 | 13 12 11 10 | 09 08 07 06 |
| 7 | 0 | 1 | 1 | 1 | 06 05 04 03 | 02 01 00 63 | 62 61 60 59 | 58 57 56 55 | 54 53 | · · · · · | 24 23 | 22 21 20 19 | 18 17 16 15 | 14 13 12 11 | 10 09 08 07 |
| 8 | 1 | 0 | 0 | 0 | 07 06 05 04 | 03 02 01 00 | 63 62 61 60 | 59 58 57 56 | 55 54 | · · · · · | 25 24 | 23 22 21 20 | 19 18 17 16 | 15 14 13 12 | 11 10 09 08 |
| 9 | 1 | 0 | 0 | 1 | 08 07 06 05 | 04 03 02 01 | 00 63 62 61 | 60 59 58 57 | 56 55 | · · · · · | 26 25 | 24 23 22 21 | 20 19 18 17 | 16 15 14 13 | 12 11 10 09 |
| 10 | 1 | 0 | 1 | 0 | 09 08 07 06 | 05 04 03 02 | 01 00 63 62 | 61 60 59 58 | 57 56 | · · · · · | 27 26 | 25 24 23 22 | 21 20 19 18 | 17 16 15 14 | 13 12 11 10 |
| 11 | 1 | 0 | 1 | 1 | 10 09 08 07 | 06 05 04 03 | 02 01 00 63 | 62 61 60 59 | 58 57 | · · · · · | 28 27 | 26 25 24 23 | 22 21 20 19 | 18 17 16 15 | 14 13 12 11 |
| 12 | 1 | 1 | 0 | 0 | 11 10 09 08 | 07 06 05 04 | 03 02 01 00 | 63 62 61 60 | 59 58 | · · · · · | 29 28 | 27 26 25 24 | 23 22 21 20 | 19 18 17 16 | 15 14 13 12 |
| 13 | 1 | 1 | 0 | 1 | 12 11 10 09 | 08 07 06 05 | 04 03 02 01 | 00 63 62 61 | 60 59 | · · · · · | 30 29 | 28 27 26 25 | 24 23 22 21 | 20 19 18 17 | 16 15 14 13 |
| 14 | 1 | 1 | 1 | 0 | 13 12 11 10 | 09 08 07 06 | 05 04 03 02 | 01 00 63 62 | 61 60 | · · · · · | 31 30 | 29 28 27 26 | 25 24 23 22 | 21 20 19 18 | 17 16 15 14 |
| 15 | 1 | 1 | 1 | 1 | 14 13 12 11 | 10 09 08 07 | 06 05 04 03 | 02 01 00 63 | 62 61 | · · · · · | 32 31 | 30 29 28 27 | 26 25 24 23 | 22 21 20 19 | 18 17 16 15 |
| | S4 | | | | | | | S3 | | | S2 | S1 | | | |

FIG. 25

| OP CODE | BIT OPERATION | MEMORY OPERATION |
|---|---|---|
| 0000 | 0 | W |
| 0001 | $\overline{D \text{ OR } S}$ | R/W |
| 0010 | $\overline{D}$ AND S | R/W |
| 0011 | $\overline{D}$ | R/W |
| 0100 | D AND $\overline{S}$ | R/W |
| 0101 | $\overline{S}$ | W |
| 0110 | D EOR S | R/W |
| 0111 | $\overline{D \text{ AND } S}$ | R/W |
| 1000 | D AND S | R/W |
| 1001 | $\overline{D \text{ EOR } S}$ | R/W |
| 1010 | S | W |
| 1011 | $\overline{D}$ OR S | R/W |
| 1100 | D | R/W |
| 1101 | D OR $\overline{S}$ | R/W |
| 1110 | D OR S | R/W |
| 1111 | 1 | W |

RASTER OPERATION APPARATUS FOR EXECUTING A DRAWING ARITHMETIC OPERATION WHEN WINDOWS ARE DISPLAYED

BACKGROUND OF THE INVENTION

The present invention relates to a raster operation apparatus for drawing display data on a display of an information processing apparatus at a high speed and, more particularly, to a raster operation apparatus for executing a drawing arithmetic operation at a high speed when windows or the like are synthesized and displayed.

Hitherto, in the window synthetic display or the like in a CRT display of the information processing apparatus, a raster operation apparatus is provided to produce new display data with regard to the overlapped portion of two display data. As shown on the left side of FIG. 1, it is now assumed that a source window 202 and a destination window 204 have been stored in a frame memory 200. As shown on the right side of FIG. 1, in the case where the source window 202 is moved to the position of the destination window 204 and is synthesized thereto, new data must be produced with respect to a region 206 in which both of those windows overlap. An arithmetic operation for this purpose is executed by the raster operation apparatus having a hardware construction of FIG. 2.

The frame memory 200 stores pixel data which is designated by addresses (X, Y). In case of the black and white display, since it is sufficient that each pixel data is constructed by one bit, one pixel data corresponds to one bit. On the other hand, in case of a color display, one pixel data is constructed by 24-bit data in which, for example, each of the R, G, and B data consists of eight bits. To simplify an explanation, it is now assumed that a black and white display is executed and one pixel corresponds to one bit as an example.

In FIG. 2, the raster operation apparatus comprises a source data storing section 210 having source registers 210-1 (SDR) and 210-2 (SDR), a shifter 212, a bit operating section 215, a destination register 216 (DDR), and selectors 208 and 214. The shifter 212 receives source data form the source registers 210-1 and 210-2 in parallel and circulatingly shifts the source data by only a designated bit amount, thereby generating shift outputs S1 and S2 on a source data unit basis. Specifically speaking, the shifter 212 is constructed by a gate switch network which can perform a switching control on a bit unit basis between the input bit train and the output bit train and functions as a kind of multiplexer. The bit operating section 215 overlaps the source data and the destination data by a bit arithmetic operation such as AND, OR, EOR, or the like, thereby producing new destination data. Each of the source registers 210-1 and 210-2 and the destination register 216 has a width of 16 bits. The shifter 212 has a width of 32 bits. Each of the shift outputs S1 and S2 has a width of 16 bits. Therefore, as a shift output S1 of the shifter 212, (0) to (15) bits of the shifter 212 having a width of 32 bits are generated. As a shift output S2, (16) to (31) bits are generated.

FIG. 3 shows the operation of the raster operation apparatus of FIG. 2. Attention is now turned to the head region of the source window 202. In this portion, source data (D1), (E1), (F1), and (G1) have been separately stored on the basis of a boundary unit as a physical memory unit of the frame memory 200. One boundary unit has a width of 16 bits. When the head region of the destination window 204 is seen, destination data (D2), (E2), (F2), and (G2) have similarly been stored on a boundary unit basis.

The raster operation to overlap the head source data (D1) to the destination data (D2) will now be considered. FIG. 4 shows a state in which the source data (D1) is moved as it is and is overlapped to the destination data (D2). Since the data process in this case is executed on a boundary unit basis, there is a possibility such that a bit deviation exists in the boundary of the width of 16 bits between the source data (D1) and the destination data (D2). In case of FIG. 4, there is a deviation of seven bits. In the raster operation, accordingly, it is necessary to produce the shift data (S1) shown in FIG. 5 by shifting the source data (D1) in FIG. 4 to the right by only seven bits, thereby matching the bit position to the destination data (D2). Such a bit shifting process is executed by the shifter 212 in FIG. 2.

FIG. 6 shows a function of the shifter 212 when the source data is shifted by seven bits as shown in FIG. 5. An input bit train 218 having a width of total 32 bits comprising the output data having a width of 16 bits from the source register 210-1 and the output data having a width of 16 bits from the source register 210-2 is shifted to the right by seven bits by the switching connecting operations of a group of internal gate switches and becomes an output bit train 220. Specifically, the (0) to (15) bits from the source register 210-1 in the input bit train 218 are shifted to the (7) to (22) bits in the output bit train 220. At the same time, nine bits among the (0) to (15) bits from the source register 210-2 in the input bit train 218 are shifted to the (23) to (31) bits in the output bit train 220 and remaining six bits are circulated to the left side of the output bit train 220 and become the (0) to (6) bits. If such a switching connecting state of the 7-bit shift has previously been realized in the shifter 212, by merely sequentially storing the source data into the source registers 210-1 and 210-2, the source data which was shifted by seven bits can be obtained by hardware.

FIGS. 7 to 10 show the shifting operation in the case where the source data (D1), (E1), (F1), and (G1) are sequentially read out from the source window 202 in the frame memory 200 of FIG. 3 and supplied to the shifter 212 which has already been set in the 7-bit shifting state in FIG. 6. In the raster operation apparatus in FIG. 2, when the selector 208 has already been switched to the source register 210-1 side and the source data (D1) is first read out from the frame memory 200 in the first cycle, the source data (D1) is stored into the source register 210-1 through the selector 208. In the second cycle, the destination data (D2) is read out from the frame memory 200 and stored into the destination register 216. In the third cycle, as shown in FIG. 7, the source data (D1) stored in the source register 210-1 passes through the shifter 212, so that it becomes the output bit train which has shifted to the right by seven bits. In this instance, the selector 214 selects the shift output (S1) and the bit operating section 215 fetches the shift data (S1) and destination data (D2) and executes a predetermined bit arithmetic operation and generates as new destination data (D3). The destination data (D3) from the bit operating section 215 is written to the position of the destination data (D2) in the frame memory 200 in the same third cycle.

The selector 208 is subsequently switched to the source register 210-2 side and the source data (E1) is read out from the frame memory 200 and stored. Subsequently, the destination data (E2) is stored into the destination register 216. In this case, the shifter 212 shifts the source data (E1) as shown in FIG. 8, the selector 214 selects the shift data (S2), and the bit operating section 215 executes a bit arithmetic operation with the destination data (E2) and forms new destination data (E3) and writes into the fame memory 200.

Subsequently, the selector 208 is switched to the source register 210-1 side and the source data (F1) is read out from the frame memory 200 and stored. Subsequently, the destination data (G2) is stored into the destination register 216. In this case, the shifter 212 shifts the source data (F1) as shown in FIG. 9. The selector 214 selects the shift data (S1). The bit operating section 215 executes a bit arithmetic operation with the destination data (F2) and forms new destination data (F3) and writes into the frame memory 200.

Further, the selector 208 is switched to the source register 210-2 side and the source data (G1) is read out from the frame memory 200 and stored. Subsequently, the destination data (G2) is stored into the destination register 216. In this case, the shifter 212 shifts the source data (G1) as shown in FIG. 10. The selector 214 selects the shift data (S2). The bit operating section 215 executes a bit arithmetic operation with the destination data (G2) and forms new destination data (G3) and writes into the frame memory 200.

In addition to a mode to synthesizing the source data and the destination data, the raster operation apparatus in FIG. 2 has a mode to merely move the position of the source data in the memory. Either one of those modes can be arbitrarily designated by using an OP code. In the mere moving mode of the source data, the cycle for reading out the destination data from the frame memory 200 and storing into the destination register 216 is omitted, by allowing the source data of the source register 210-1 or 210-2 to pass through the shifter 212, the source data is shifted by the bits corresponding to the bit deviation on the movement destination side, and the bit operating section 215 executes a bit arithmetic operation for generating as it is or inverting the shifted source data and generates as new destination data.

The timing chart of FIG. 11 shows the case where the source data (D1), (E1), (F1), and (G1) were merely moved in the frame memory 200 without any destination data. First, the source data (D1) is read in a T1 cycle. The output of the source register 210-1 is derived from a T2 cycle. In the T2 cycle, the shift data (S1) is supplied from the selector 214 to the bit operating section 215. The bit operating section 215 executes a bit arithmetic operation without any destination data and generates the new destination data (D3) and writes into the frame memory 200. In the next T3 cycle, the new destination data (D3) written in the frame memory 200 is read out and displayed on the CRT.

In the T3 cycle, the next source data (E1) is read out. In a T4 cycle, new destination data (E3) is derived as an output of the bit operating section 215 and written into the frame memory 200. In a manner similar to the above, processes are also executed as shown in T5 to T9 cycles with respect to the source data (F1) and (G1).

In the operations of such a conventional raster operation apparatus, however, after completion of the bit arithmetic operation, when the source data of the next boundary is read in, for example, each of the T2, T4, T6, and T8 cycles in which the new destination data is being written into the memory, the correct shift output from the shifter 212 is broken. Thus, the new destination data which is being written into the memory is broken. Therefore, until the memory writing operation in each of the T2, T4, T6, and T8 cycles is finished, no source data can be newly read. In each of the T2, T4, T6, and T8, an idling state 222 occurs in the memory access and the processing speed becomes slow due to the occurrence of such an idling state, so that the raster operation cannot be executed at a high speed.

SUMMARY OF THE INVENTION

According to the invention, a raster operation apparatus which can execute the raster operation at a high speed without causing an idling state in the memory access during the raster operation is provided. The raster operation apparatus of the invention moves the source data of a window or the like stored in a frame memory for transfer to the position of destination data of a window or the like stored in a frame memory for display, and is synthesized thereto. The invention also incorporates a case where in the frame memory for transfer or frame memory for display, the source data is synthesized to the destination data on the movement destination side.

Data is read out or written from/into the frame memory while using a predetermined memory area obtained by physically dividing the frame memory, namely, boundaries as one processing unit. For example, in case of the black and white pixel data corresponding to the bits, one boundary has a width of 16 bits. In case of the RGB color pixel data, one pixel data consists of 24 bits and one boundary has a width of 16 pixels and corresponds to a width of 384 bits as a bit expression. It is now assumed that a storing area of the source data is set to the first memory area and a storing area of the destination data is set to the second memory area.

The raster operation apparatus comprises a first register section, a second register section, a shift section, two bit arithmetic operating sections, and a control section. The first register section receives and holds the source data of at least four boundaries which were sequentially read out from the first memory area on a boundary unit basis. The second register section receives and holds the destination data of at least two boundaries which were sequentially read out from the second memory area on a boundary unit basis. The shift section receives in parallel the source data held in the first register section every boundary and shifts the source data so as to coincide with the data starting positions in the boundaries of the destination data and generates the shifted data in parallel on a boundary unit basis. The two operating sections alternately fetch the source data of a specific boundary generated from the shift section and the destination data in the second register section corresponding to the source data and execute predetermined bit arithmetic operations and generate new destination data. In parallel with the inputting and holding operations of the source data into the first register section and the inputting and holding operations of the destination data into the second register section, the control section allows the two bit operating sections to alternately execute the bit arithmetic operations by the fetching of the source data from the shift section and the destination data from the second register section.

In more detail, the first register section has first to fourth source registers which can sequentially receive and hold the four unit source data (D1), (E1), (F1), and (G1). The second register section has first and second destination registers which can sequentially receive and hold the two unit destination data (D2) and (E2) and the two unit destination data (F2) and (G2). Further, the control section executes the following first to fourth phase processes subsequent to the initial phase process. In the initial phase process, the first source data (D1) is supplied and held into the first source register and the first destination data (D2) is supplied and held into the first destination register.

In the first phase process, when the source data (D1) of the first source register is shifted by the shift section and the shift output is generated therefrom and is bit-operated together with the destination data (D2) of the first destination register by one of the two bit operating sections, in parallel with the bit arithmetic operation, the source data (E1) is supplied and held into the second source register and the destination data (E2) is supplied and held into the second destination register.

In the second phase process, when the source data (E1) of the second source register is shifted by the shift section and the shift output is generated therefrom and is bit-operated together with the destination data (E2) of the second destination register by the other bit operating section, in parallel with the bit arithmetic operation, the third source data (F1) is supplied and held into the third source register and the third destination data (F2) is supplied and held into the first destination register.

In the third phase process, when the source data (F1) of the third source register is shifted by the shift section and the shift output is generated therefrom and is bit-operated together with the destination data (F2) of the second destination register by one of the two bit operating sections, in parallel with the bit arithmetic operation, the fourth source data (G1) is supplied and held into the fourth source register and the fourth destination data (G2) is supplied and held into the first destination register.

In the fourth phase process, when the source data (G1) of the fourth source register is shifted by the shift section and the shift output is generated therefrom and is bit-operated by one of the two bit operating sections, in parallel with the bit arithmetic operation, the fifth source data (D1) is supplied and held into the fourth source register and the fifth destination data (D2) is supplied and held into the first destination register. The above first to fourth phase processes are repeated hereinafter.

The shift section shifts and generates the source data separately at two stages. For those purpose, the shift section has a first shift section, a second shift section, and a shift control section. Now, assuming that the maximum shift amount that is decided by the number of data of one boundary of the source data is set to (m+n), the first shift section selects and generates either one of the shifted data trains while circulating the data position of the inputted source data every 0, 1, - - - , (m−1) data. The second shift section receives the data train which was selected and supplied from the first shift section and selects and generates either one of the shifted data trains while circulating the data position of the inputted source data on an m unit basis every 0, (1×m), - - - , {(n−1)×m} data. The shift control section controls the selecting operation of the data train of each of the first and second shift sections on the basis of the shift amount of the source data.

For example, in the case where the maximum shift amount (m+n)=16 which is determined by the number (=16) of data of one boundary is divided into two stages (m=4 and n=4) and the source data is shifted, the first shift section selects and generates either one of the shifted data trains while circulating the data positions of the inputted 64 source data every 0, 1, 2, and 3 data with respect to the data train of such 64 source data. The second shift section selects and generates either one of the shifted data trains while circulating the data positions every 0, 4, 8, and 12 data on a 4-data unit basis with respect to the 64 data trains which were selected and supplied from the first shift section.

Further, when it is assumed that a binary number indicative of the shift amount of the source data is set to (A3, A2, A1, A0), the shift control section stage decodes the binary number of four bits and obtains a first decoded output indicative of either one of the shift amounts 0, 1, 2, and 3 of decimal number and a second decoded output indicative of either one of the shift amounts 0, 4, 8, and 12. The shift control section allows the first shift section to select the data train of the corresponding shift amount by the first decoded output and allows the second shift section to select the data train of the corresponding shift amount by the second decoded output.

In case of a color display, one processing unit of the source data and destination data which is decided by the boundary unit of the frame memory is constructed by a predetermined number of pixel data. One pixel data in this case is constructed by a plurality of bits indicative of the color component. For example, one pixel data is constructed by 24 bits including eight bits of each of R, G, and B. On the other hand, in case of a black and white display, since one pixel corresponds to one bit, one processing unit of the source data and destination data is set to a predetermined bit width, for example, 16 bits.

The bit operating section executes either one of the AND of the source data and the destination data, inverted AND, OR, inverted OR, exclusive OR, and inverted exclusive OR. Further, it is also possible to execute the arithmetic operations of the AND and OR by using the value which is obtained by inverting either one of the source data and the destination data. The new destination data calculated by the bit operating section is written into the second memory area. The bit train calculated by the bit operating section can be also supplied and displayed by a CRT as read data.

As mentioned above, the raster operation apparatus of the invention can read the source data in parallel even during the memory writing operation after completion of the bit arithmetic operation and no idling state occurs in the memory access. Therefore, the raster operation can be executed at a high speed, the display data can be drawn at a high speed, and the performance of the information processing apparatus is improved.

The above and other objects, features, and advantages of the present invention will become more apparent from the following detailed description with reference to the drawings.

BRIEF DESCRIPTION OF THE DRAWINGS

FIG. 23 is an explanatory diagram showing a shift amount for a combination of control signals of the first and second shift sections;

FIG. 24 is an explanatory diagram showing the relations among the shift amount, the 4-bit shift amount signal, and the 64 bit trains;

FIG. 25 is an explanatory diagram showing an operating mode by a bit operating section;

DETAILED DESCRIPTION OF THE PREFERRED EMBODIMENT

Figure 12:
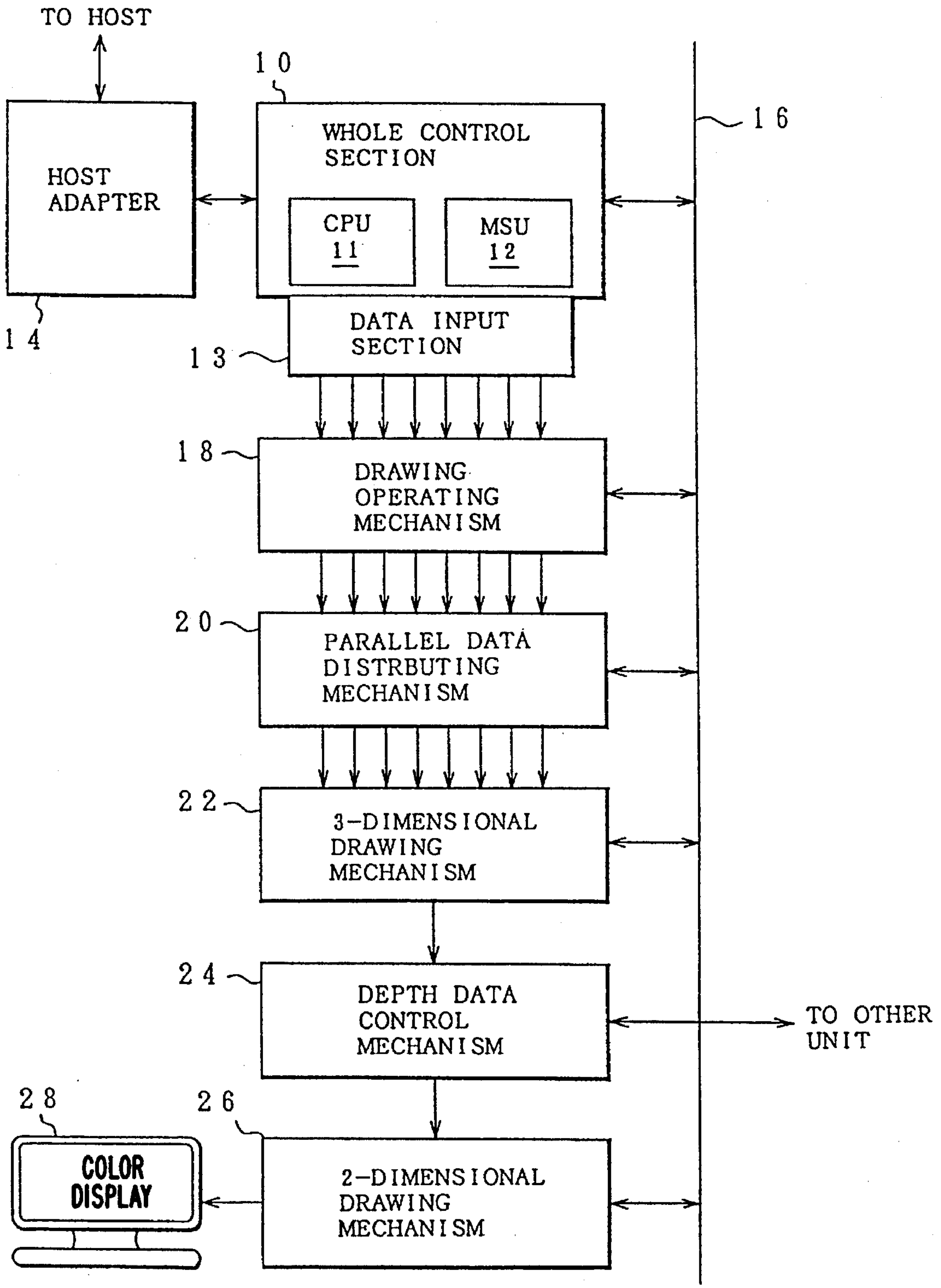
FIG. 12 is a block diagram of a 3-dimensional graphics drawing apparatus to which the invention is applied.

FIG. 12 is a block diagram showing a construction of one unit of a 3-dimensional drawing system in case of using a raster operation apparatus of the invention in a 2-dimensional drawing mechanism. A plurality of such units are provided as necessary. A CPU 11 and a main storage unit 12 are provided in a whole control section 10. The whole control section 10 is connected to a host computer through a host adapter 14. A drawing command and figure data indicative of a 3-dimensional object are supplied from the host computer to the whole control section 10 through the host adapter 14. Subsequent to the whole control section 10, a drawing processing mechanism 18 is connected through a data input section 13. The drawing processing mechanism 18 has therein, for example, 32 digital signal processors and construct eight parallel pipelines or a 5-dimensional hypercube and executes drawing processing arithmetic operations in parallel. Namely, the eight pipelines of the drawing processing mechanism 18 set visual points and light sources for figure data as a set of pixels constructing a 3-dimensional model and executes geometric conversions such as calculations of coordinates, clipping, color calculation, and the like, and the line segment formation as a pre-process of the drawing by a program control based on a software and develops into the line segment data every pixel. Eight arithmetic operation results of the drawing processing mechanism 18 are sent to a 3-dimensional drawing mechanism 22 through a parallel data distributing mechanism 20. A data transfer apparatus using an FIFO memory is provided in a parallel data distributing mechanism 20 and distributes the drawing data which is asynchronously produced by the parallel pipelines of the drawing processing mechanism 18 and transfers to the 3-dimensional drawing mechanism 22 at the next stage.

The 3-dimensional drawing mechanism 22 receives the drawing data which was developed into the line segment data every polygon and obtains the pixels which can fill an interval between the start point and the end point of a line segment by an interpolating calculation and maps the pixel data into a 3-dimensional frame memory. The 3-dimensional drawing mechanism 22 further executes the blending, hidden image erasure, or the like to each pixel and maps the processed pixel data into the 3-dimensional frame memory. The data drawn in the 3-dimensional frame memory of the 3-dimensional drawing mechanism 22 is transferred to a 2-dimensional drawing mechanism 26 through a depth data control mechanism 24 and displayed as 2-dimensional image data onto a color display 28. As will be obviously explained hereinlater, a raster operation apparatus of the invention is provided for the 2-dimensional drawing mechanism 26. Further, the drawing processing mechanism 18, 3-dimensional drawing mechanism 22, and 2-dimensional drawing mechanism 26 are connected to the whole control section 10 through a system bus 16 and are subjected to the management of the drawing data by the whole control section 10. In addition to a management of the drawing data, the CPU 11 of the whole control section 10 directly accesses the 2-dimensional drawing mechanism 26 through the system bus 16, thereby executing a window control. In the window control, the raster operation apparatus of the invention is activated.

Figure 13:
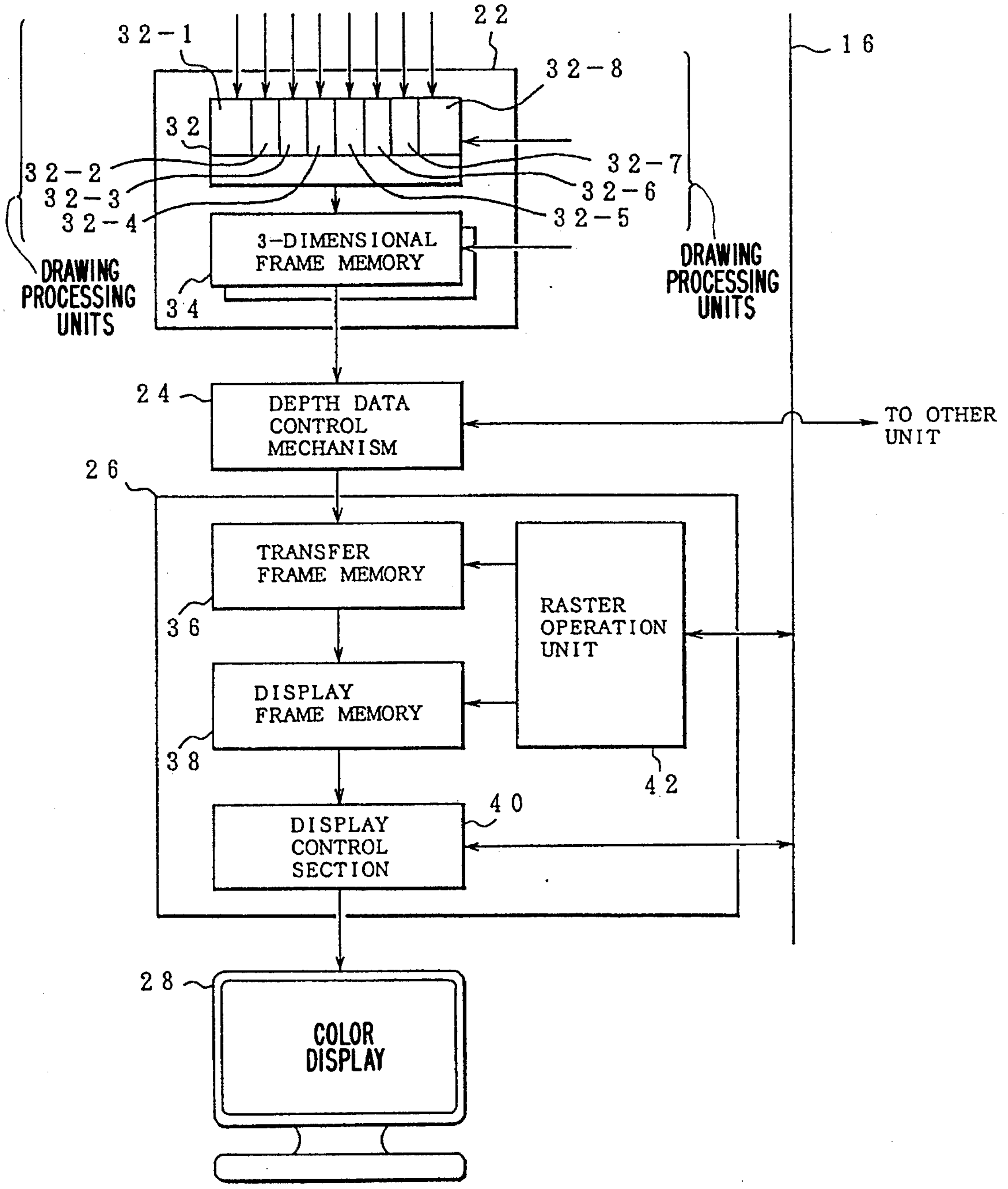
FIG. 13 is a block diagram showing the details of a drawing operating mechanism in FIG. 12.

FIG. 13 shows an embodiment of the 3-dimensional drawing mechanism and the 2-dimensional drawing mechanism in FIG. 12. Eight drawing processing units 32-1 to 32-8 and a 3-dimensional frame memory 34 are provided for the 3-dimensional drawing mechanism 22. On the basis of the drawing data which was developed into the line segment constructing the pixel and which is sent from the data distribution mechanism 20, the drawing processing units 32-1 to 32-8 executes in parallel the interpolating calculations of the pixels which fill the interval between the start point and the end point of the line segment. Memory areas as much as a plurality of image planes are prepared as a 3-dimensional frame memory 34. For example, two memory areas are prepared for the RGB pixel data, two memory areas are prepared for the Z buffer, and eight memory areas are prepared for storage or work of a texture pattern. The pixel data which was interpolation calculated by the drawing processing units 32-1 to 32-8 is drawn into the RGB areas in the 3-dimensional frame memory 34 by the address designation of the display coordinate values (x, y). At the same time, a depth coordinate value z of each pixel is stored into a Z buffer area in the frame memory 34.

Figure 14:
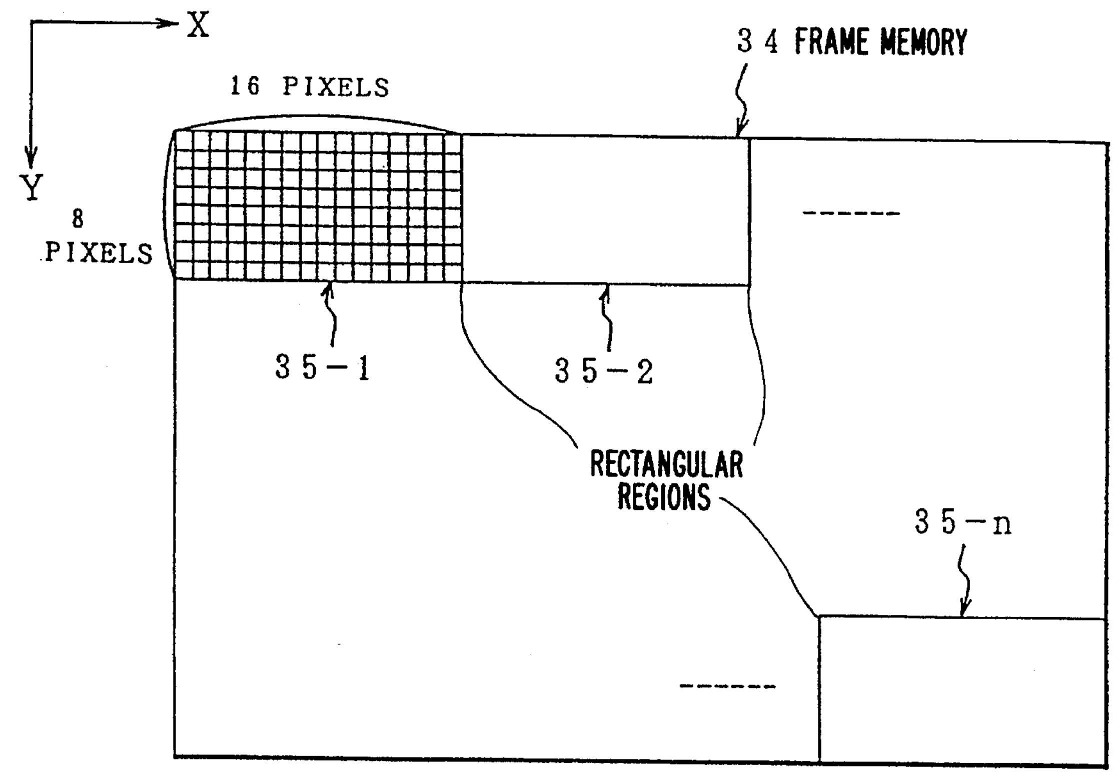
FIG. 14 is an explanatory diagram of a 3-dimensional frame memory.
Figure 15:
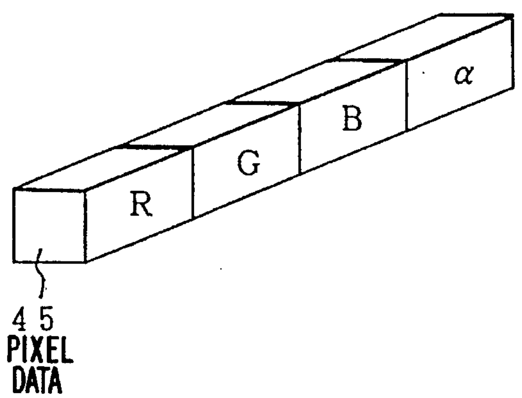
FIG. 15 is an explanatory diagram of color pixel data.

As shown in FIG. 14, the drawing processing units 32-1 to 32-8 simultaneously access arbitrary positions in rectangular regions 35-1 to 35-n each comprising (16 pixels in the lateral direction) ×(8 pixels in the vertical direction) in the frame memory 34, thereby simultaneously drawing the data of 128 pixels. FIG. 15 shows pixel data 45 which is drawn in the frame memory 34 in FIG. 14. In one pixel data 45, for example, each of the R, G, and B data is expressed by four bits and total 4096 colors can be expressed in the RGB space. Further, a transparency α of four bits is provided as additional information . In case of the 3-dimensional frame memory, the depth coordinate value z is stored into the memory area as Z buffer which is separately provided.

Referring again to FIG. 13, the 3-dimensional image data drawn in the 3-dimensional frame memory 34 of the 3-dimensional drawing mechanism 22 is transferred to the 2-dimensional drawing mechanism 26 at a display frame rate of a color display 28. The 2-dimensional drawing mechanism 26 has a transfer frame memory 36 to store the image data transferred from the 3-dimensional drawing mechanism 22, and a display frame memory 38 for allowing the frame contents to be displayed onto the color display 28 through a display control section 40. Further, a raster operation unit 42 to execute the raster operation based on the window control from the whole control section 10 is provided for the transfer frame memory 36 and the display frame memory 38. The raster operation unit 42 is subjected to the control by the whole control section 10 and develops a window as source data into the transfer frame memory 36. When the window is displayed by the color display 28, it is written into the display frame memory 38 through the raster operation, and the data written in the display frame memory 38 is read out and displayed by the color display 28. In a manner similar to the 3-dimensional frame memory 34 shown in FIG. 14, with respect to the transfer frame memory 36 and the display frame memory 38, as a physical access unit to read or write data from/into the frame memories, 16 pixels in the X address direction are set into one processing unit, namely, one boundary unit and the reading or writing operation is executed. Therefore, the raster operation unit 42 also reads out or writes data from/into the transfer frame memory 36 on a boundary unit basis, namely, on a 16-pixel unit basis. In a color display, the raster operation unit 42 handles total 24 bits of the R, G, and B data each consisting of eight bits as one pixel data. However, in an embodiment of the raster operation apparatus of the invention, which will be clearly explained hereinlater, the black and white display will be explained as an example for simplicity of description. In the black and white display, since one pixel can be expressed by one bit, one pixel = one bit. Therefore, a physical processing unit of the frame memory shown in FIG. 14 is set to a boundary unit having a width of 16 bits in the X address direction.

The depth data control mechanism 24 executes a merging process based on the depth coordinate value (z) of each image data when the image data stored in the 3-dimensional frame memory 34 is synthesized to the image data from another unit and the synthesized data is transferred to the 2-dimensional drawing mechanism 26.

Figure 16:
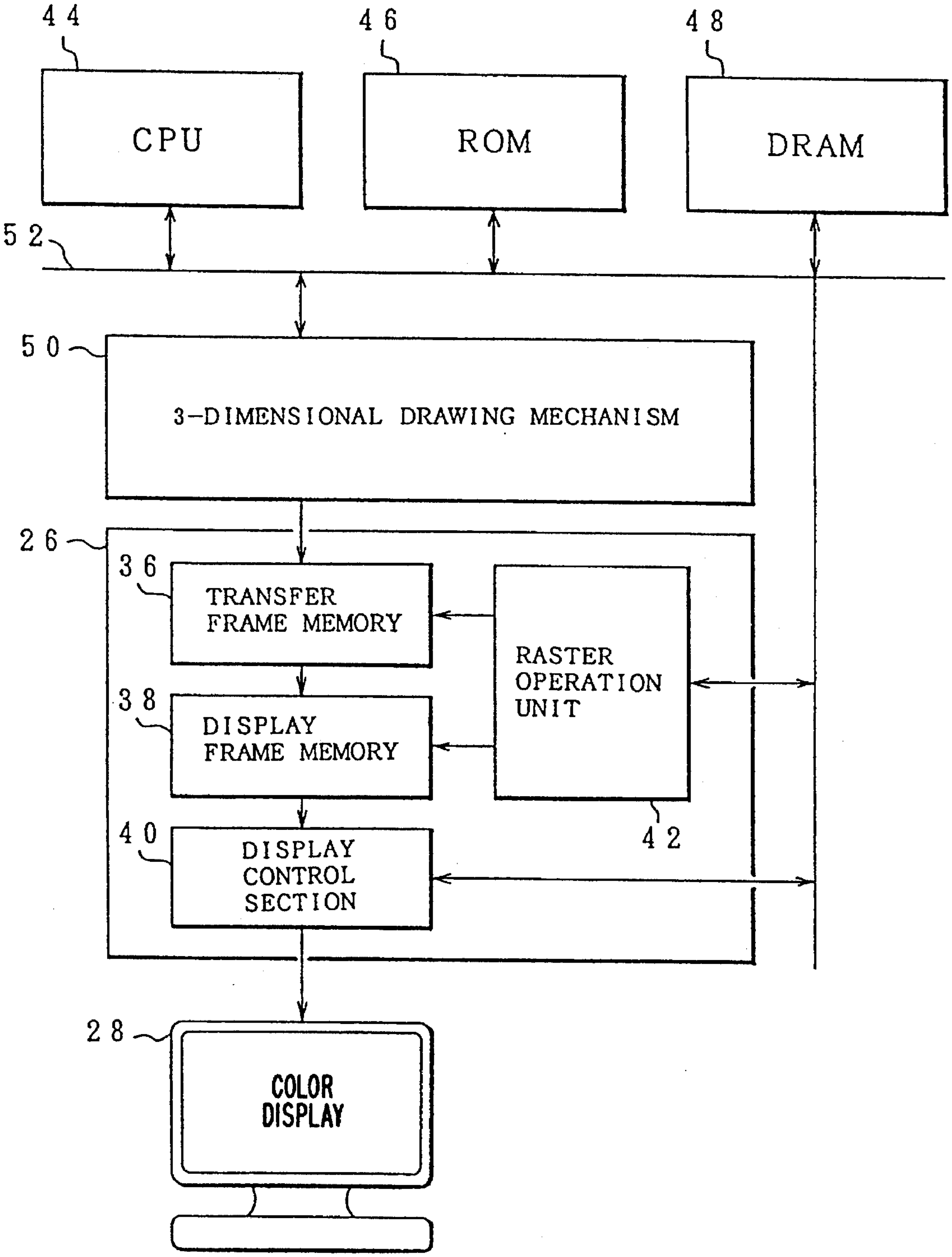
FIG. 16 is a block diagram of another 3-dimensional graphics drawing apparatus to which the invention is applied.

FIG. 16 shown another example of a 3-dimensional graphics drawing apparatus to which the raster operation apparatus of the invention is applied. In the 3-dimensional graphics drawing apparatus, the process of the drawing processing mechanism 18 in the apparatus of FIG. 12 is executed every pixel by a CPU 44 by a program process. A set of line segment data obtained with respect to one pixel is transferred to a 3-dimensional drawing mechanism 50. The 3-dimensional drawing mechanism 50 has a function of one of the drawing processing units 32-1 to 32-8 shown in FIG. 13 and executes the interpolating calculations based on the line segment data given from the CPU 44, thereby performing a mapping process to the built-in 3-dimensional frame memory. An ROM 46 in which a program and the like have been stored and a rewritable DRAM 48 are connected to the bus 52 of the CPU 44. In a manner similar to the case of FIG. 13, the 2-dimensional drawing mechanism 26 provided subsequent to the 3-dimensional drawing mechanism 50 comprises the frame memory 36 for transfer, frame memory 38 for display, display control section 40, and raster operation unit 42. The 3-dimensional graphics drawing apparatus shown in FIG. 16 is a simplified apparatus having the processing performance of one system of the apparatus having the 8-parallel processing function shown in FIG. 12.

Figure 17:
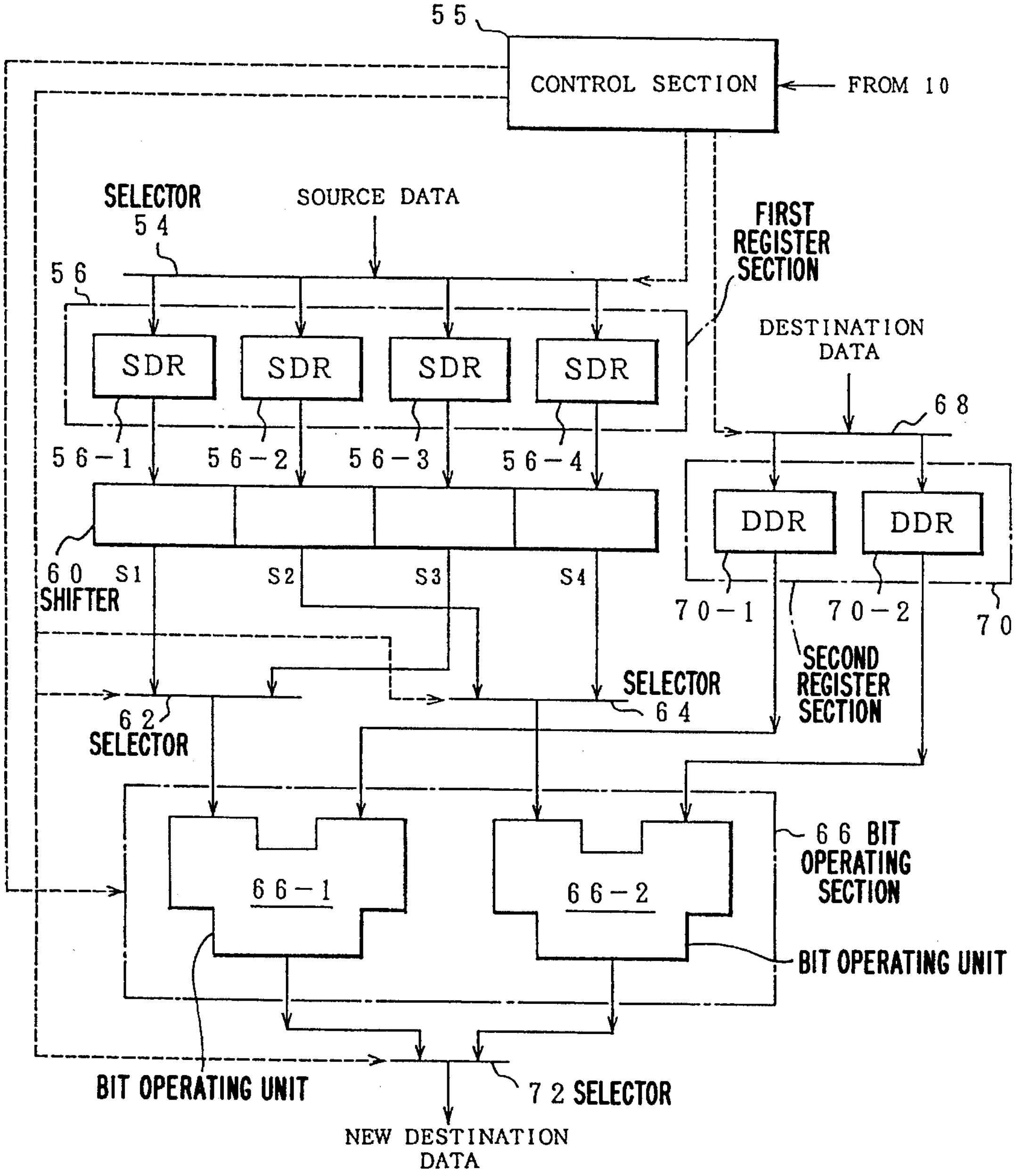
FIG. 17 is a block diagram showing an embodiment of a raster operation apparatus of the invention.

FIG. 17 shows an embodiment of the raster operation unit 42 provided in the 2-dimensional drawing mechanism in FIGS. 13 and 16. The embodiment relates to an example of black and white pixel data as pixel data which is stored into the transfer frame memory 36 and the display frame memory 38 and one pixel corresponds to one bit. Therefore, one boundary unit as a physical processing unit of the frame memories 36 and 38 is set to a width of 16 bits in the X address direction.

Subsequent to a selector 54, four source registers 56-1, 56-2, 56-3, and 56-4 constructing a first register section 56 are provided for the raster operation apparatus. Each of the source registers 56-1 to 56-4 has a width of 16 bits. A shifter 60 is provided subsequent to the first register section 56. The shifter 60 receives 16-bit parallel outputs, namely, outputs of total 64 bits in parallel from the four source registers (SDR) 56-1 to 56-4 provided in the first register section 56. The shifter 60 circulatingly shifts the inputted 64-bit source data by only the shift amount to match the bit start positions to preset destination data and generates the shifted data on a 16-bit unit basis of each of the shift bit trains (S1), (S2), (S3), and (S4). Subsequent to the shifter 60, a bit operating section 66 having two bit operating units 66-1 and 66-2 is provided through selectors 62 and 64.

On the other hand, a second register section 70 to read and hold the destination data as a synthesizing destination side of the source data is provided. The second register section 70 has two destination registers 70-1 and 70-2. Each of the destination registers (DDR) 70-1 and 70-2 has a width of 16 bits in correspondence to the boundary unit of the frame memory in which the destination data has been stored.

The selector 62 alternately selects the shift output (S1) as (00) to (15) bits of the shifter 60 and the shift output (S3) of the (32) to (47) bits and supplies to the bit operating unit 66-1. The selector 64 alternately selects the shift output (S2) of the (16) to (31) bits of the shifter 60 and the shift output (S4) of the (48) to (63) bits and supplies to the other bit operating unit 66-2. An output of the destination register 70-1 is supplied to the bit operating unit 66-1 and a bit arithmetic operation is executed together with the shift output (S1) or (S3) obtained through the selector 62. The other bit operating unit 66-2 fetches the shift output (S2) or (S4) obtained through the selector 64 and the destination data from the destination register 70-2 and executes a bit arithmetic operation.

Either one of the outputs of the bit operating units 66-1 and 66-2 is selected by a selector 72 and generated as new destination data and is written into a frame memory on the transfer destination side or is directly displayed on the CRT.

A whole timing control of the raster operation apparatus is executed by a control section 55. The control section 55 accesses the frame memories and controls the selectors, registers, and bit operating units on the basis of the window control in association with the raster operation by the whole control section 10 as a host apparatus. In the raster operation, the control section 55 obtains the following control data.

I. start addresses (Xss, Yss) of source window

II. sizes (Lx, Ly) of source data region

III. start addresses (Xds, Yds) of destination window

IV. setting of window transfer modes 1 to 4

V. setting of bit operating modes 1 to 16

Figure 18A:
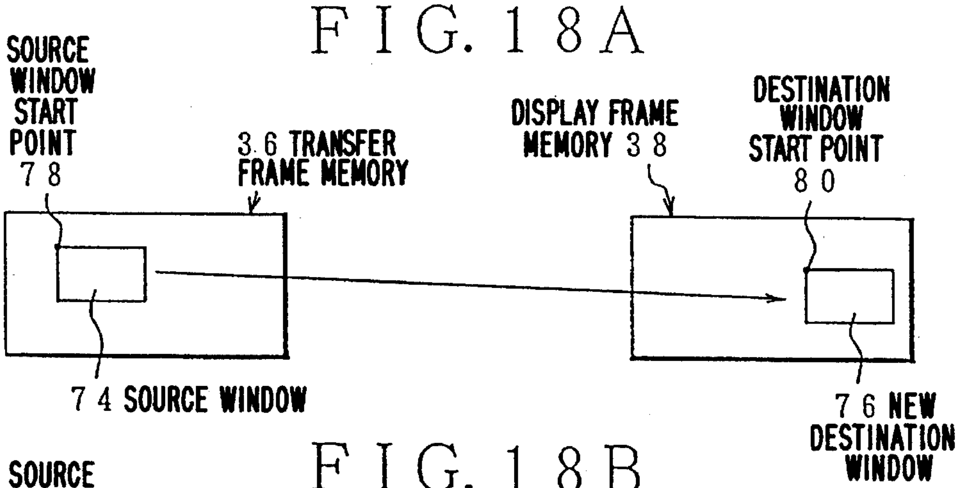
FIGS. 18A, 18B, 18C, and 18D are explanatory diagrams of processing modes according to the invention.
Figure 18B:
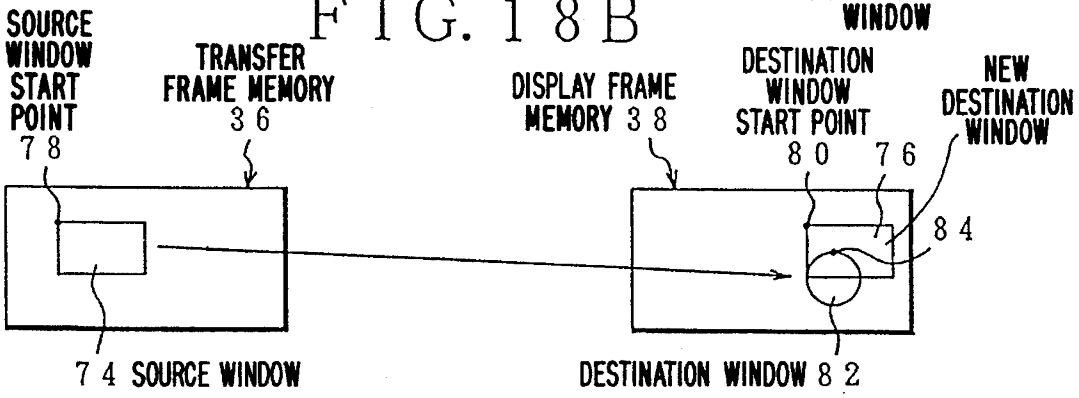
Figure 18C:
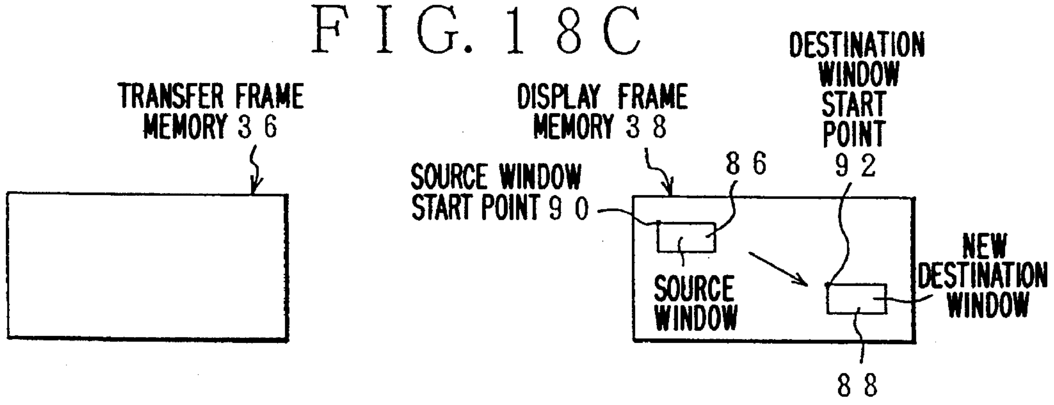
Figure 18D:
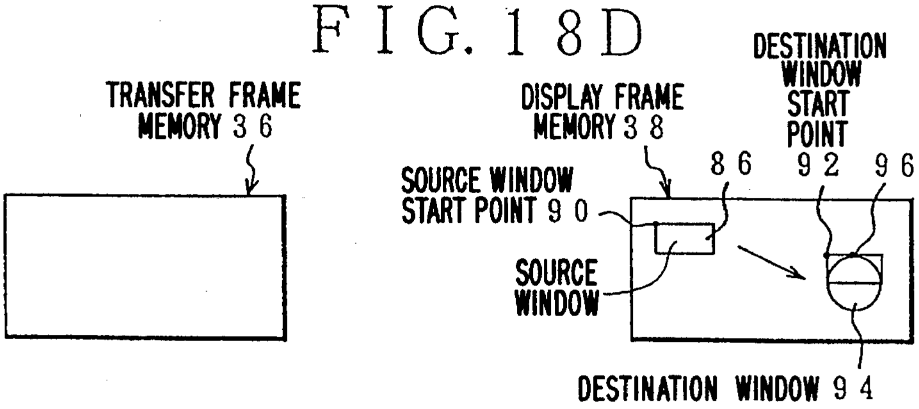

The transfer modes 1 to 4 in the raster operation are as shown in FIGS. 18A to 18D. FIG. 18A shows the transfer mode 1 and relates to the case where a source window 74 in the transfer frame memory 36 was transferred to a relatively different position in the display frame memory 38 and stored as new destination window 76. In the transfer mode 1, no destination window exists in the display frame memory 38 as a transfer destination side. FIG. 18B shows the transfer mode 2 and relates to the case where the source window 74 in the transfer frame memory 36 was transferred as a new destination window 76 into the display frame memory 38 in a manner similar to the case of FIG. 18A and, in this case, a destination window 82 exists on the window transfer destination side in the display frame memory 38 on the transfer destination side. FIG. 18C shows the transfer mode 3 and in this case, a source window 86 is moved in only the display frame memory 38, thereby obtaining a new destination window 88. In this instance, no destination data exists. Further FIG. 18D shows the transfer mode 4 and relates to the case where the source window 86 is likewise moved in the display frame memory 38 and the new destination window is obtained. However, a destination window 94 exists on the transfer destination side in this case. In addition to the transfer modes 3 and 4 shown in FIGS. 18C and 18D, it is also possible to move the window in only the transfer frame memory 36 and to add the transfer mode 5 or 6 according to the presence or absence of the destination window.

In FIG. 17, on the basis of the source window start addresses (Xss, Yss) and destination window start addresses (Xds, Yds) in the control data obtained, the control section 55 produces a shift amount ΔX as 4-bit shift amount data (A, A2, A1, A0) and supplies it to the shifter 60, thereby establishing a shift switching state. As shown in the transfer modes 1 and 3 of FIGS. 18A and 18C, in the case where both of the source windows 74 and 86 and the destination windows 76 and 88 are rectangular windows, it is sufficient that the shift amount ΔX is unconditionally determined from source window start points 78 and 90 and destination window start points 80 and 92 and to set it into the shifter 60. As shown in FIGS. 18B and 18D, however, in the case where, for example, the source windows 74 and 86 are rectangular windows and the destination windows 82 and 94 are circular windows, the bit start positions on the destination windows 82 and 94 side differ every horizontal line. Therefore, the shift amount ΔX is calculated each time and is set into the shifter 60.

Figure 19:
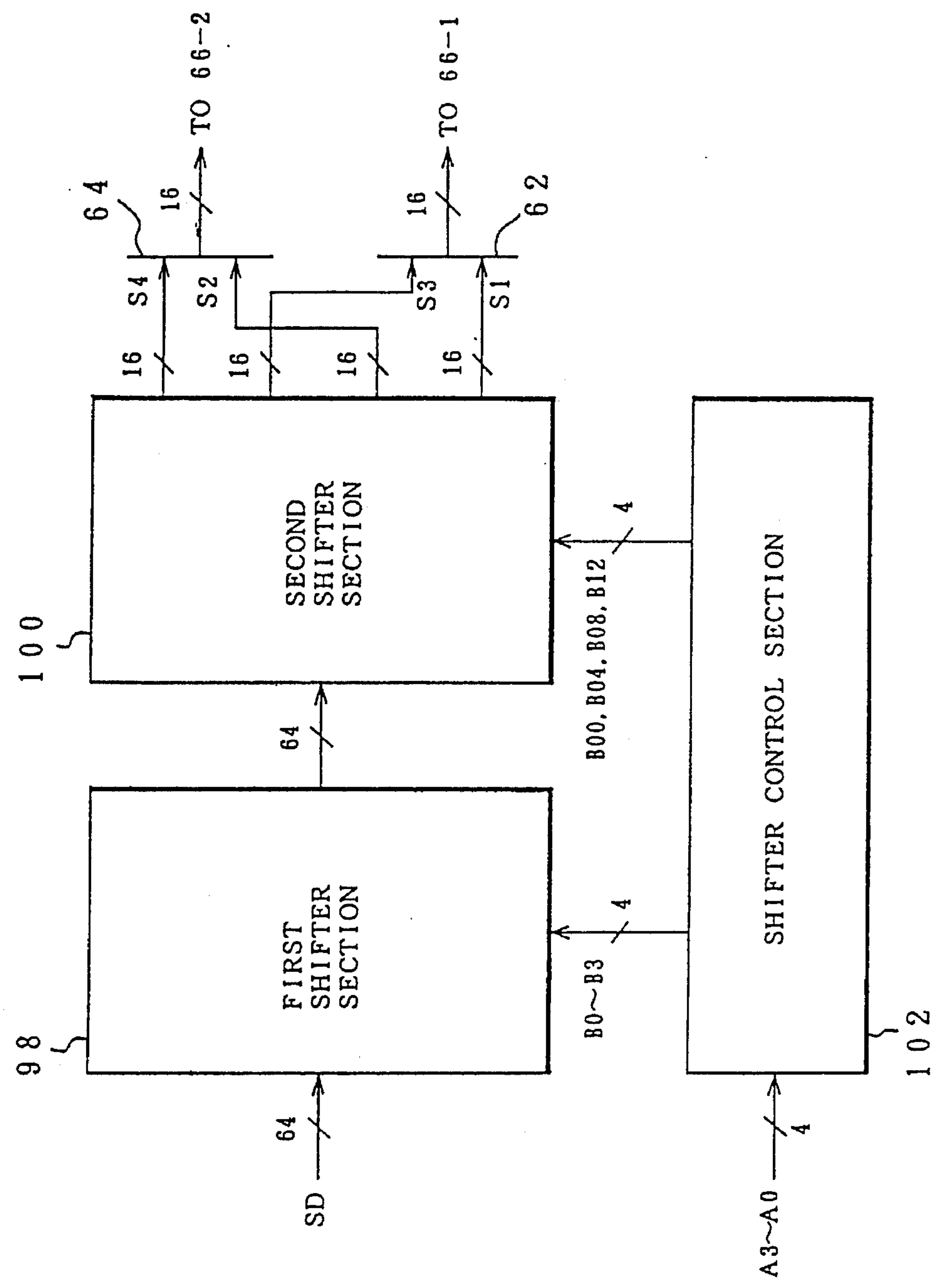
FIG. 19 is a block diagram showing an embodiment of a shifter of the invention.

FIG. 19 shows an embodiment of the shifter 60 in FIG. 17. The shifter 60 performs the shift of the first stage by a first shifter section 98 and executes the shift of the second stage by a second shifter section 100, thereby realizing the shift of a width of maximum 16 bits. Shift amounts of the first and second shifter sections 98 and 100 are controlled by a shifter control section 102. The shift outputs (S1) to (S4) are generated from the second shifter section 100 on a 16-bit width unit basis and are supplied to the bit operating units 66-1 and 66-2 through the selectors 62 and 64. A 64-bit train (SD) is supplied to the first shifter section 98 as parallel outputs from the four source registers 56-1 to 56-4 provided at the front stage. On the basis of either one of shift control signals (B1), (B2), and (B3) (which are larger than (B0)) from the shifter control section 102, the first shifter section 98 selectively generates either one of the 0-bit shift, 1-bit shift, 2-bit shift, and 3-bit shift of the inputted parallel 64-bit train. The second shifter section 100 receives the 64-bit train from the first shifter section 98 and selectively generates either one of the 0-bit shift, 4-bit shift, 8-bit shift, and 12-bit shift on the basis of either one of shift control signals (B00), (B04), (B08), and (B12) from the shifter control section 102. Shift amount data (A3 to A0) of four bits is given to the shifter control section 102.

FIG. 20 shows the details of the shifter control section 102 in FIG. 19. The shift control signals (B0 to B3) for the first shifter section 98 are obtained as results of the decoding of lower two bits (A1, A0) of the shift amount data (A3 to A0). That is, the decoding process from the lower two bits (A1, A0) of the shift amount data into the shift control signals (B0 to B3) to the first shifter section is realized by a decoding circuit comprising inverting circuits 104 and 106 and AND circuits 112, 114, 116, and 118. That is, when (A1, A0)=(0, 0), the shift control signal (B0) is effective. When (A1, A0)=(0, 1), the shift control signal (B1) is effective. When (A1, A0)=(1, 0), the shift control signal (B2) is effective. Further, when (A1, A0)=(1, 1), the shift control signal (B3) is effective. In other words, the shift control signal (B0) indicates the selection of the shift amount 0. The shift control signal (B1) indicates the selection of the shift amount 1. The shift control signal (B2) indicates the selection of the shift amount 2. Further, the shift control signal (B3) indicates the selection of the shift amount 3. On the other hand, the shift control signals (B00), (B04), (B08), and (B12) to the second shifter section 100 are obtained by decoding the upper two bits (A3, A2) of the shift amount data (A3 to A0). The decoding circuit comprises inverters 108 and 110 and AND circuits 120, 122, 124, and 126. That is, when (A3, A2)=(0, 0), the shift control signal (B00) to indicate the shift amount 0 is effective. When (A3, A2) =(0, 1), the shift control signal (B04) to indicate the shift amount 4 is effective. when (A3, A2)=(1, 0), the shift control signal (B08) to indicate the shift amount 8 is effective. Further, when (A3, A2)=(1, 1), the shift control signal (B12) to indicate the shift amount 12 is effective.

Figure 21A:
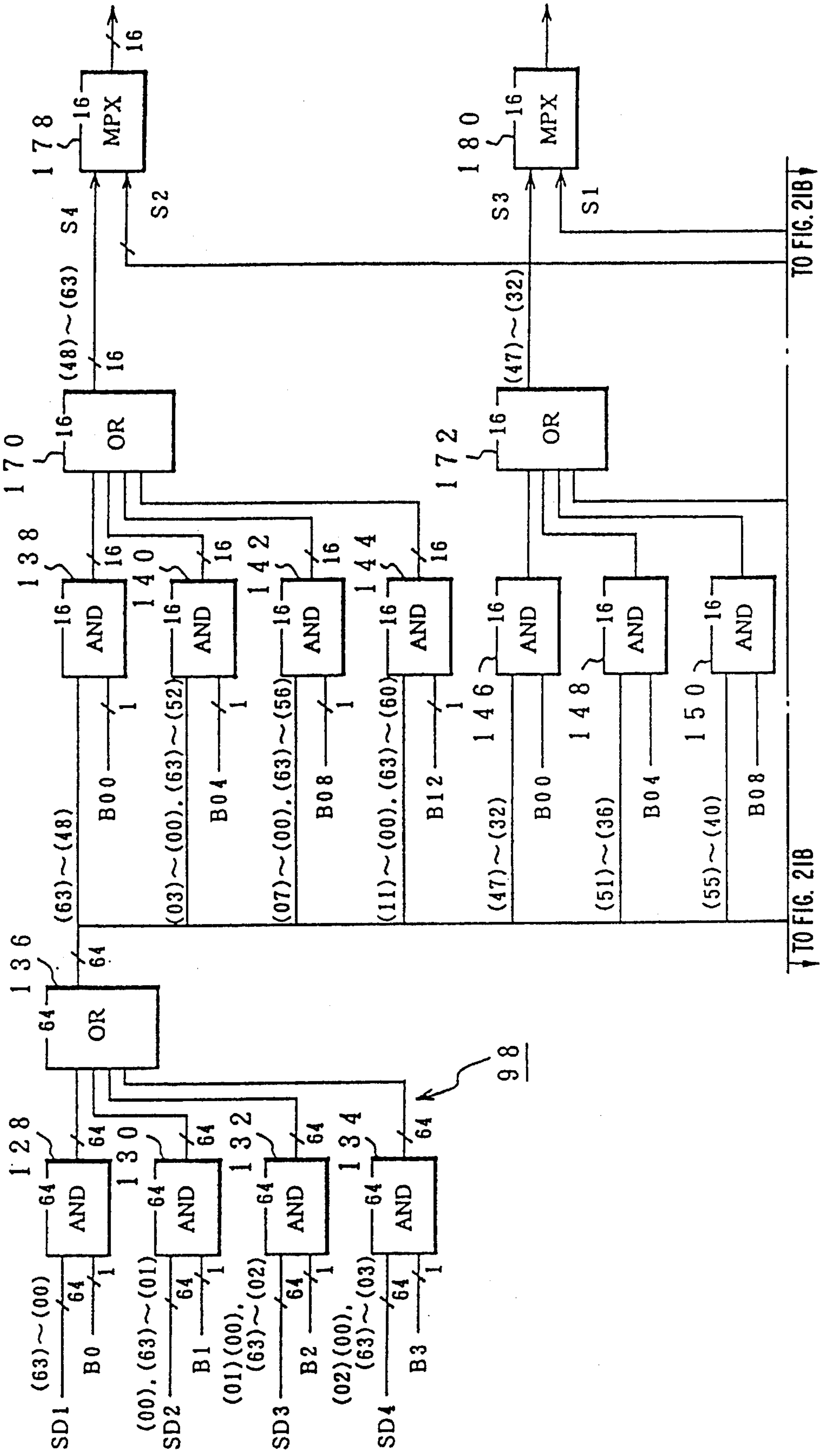
FIG. 21 is a circuit block diagram showing the details of first and second shift sections in FIG. 19.
Figure 21B:
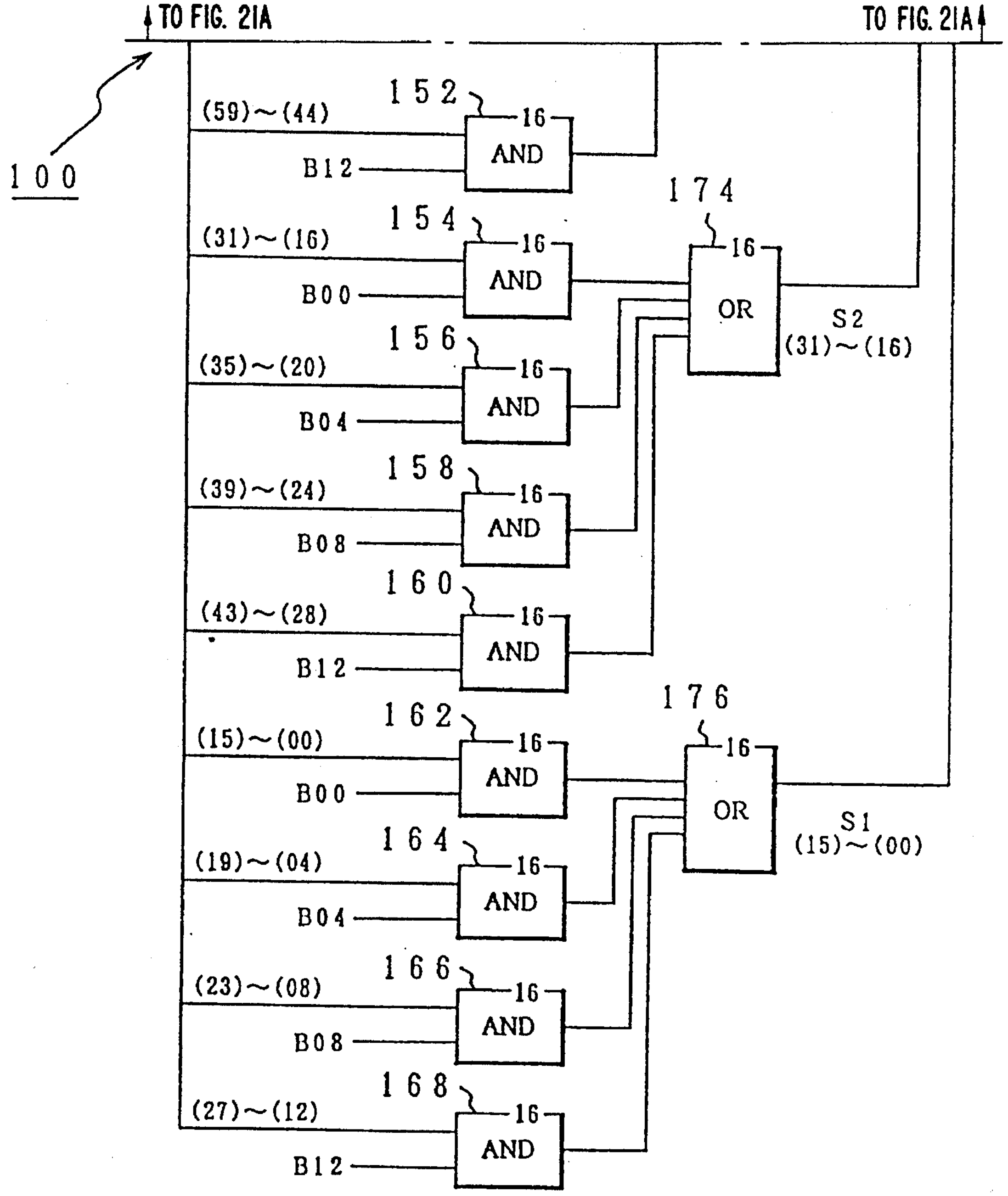
Figure 22:
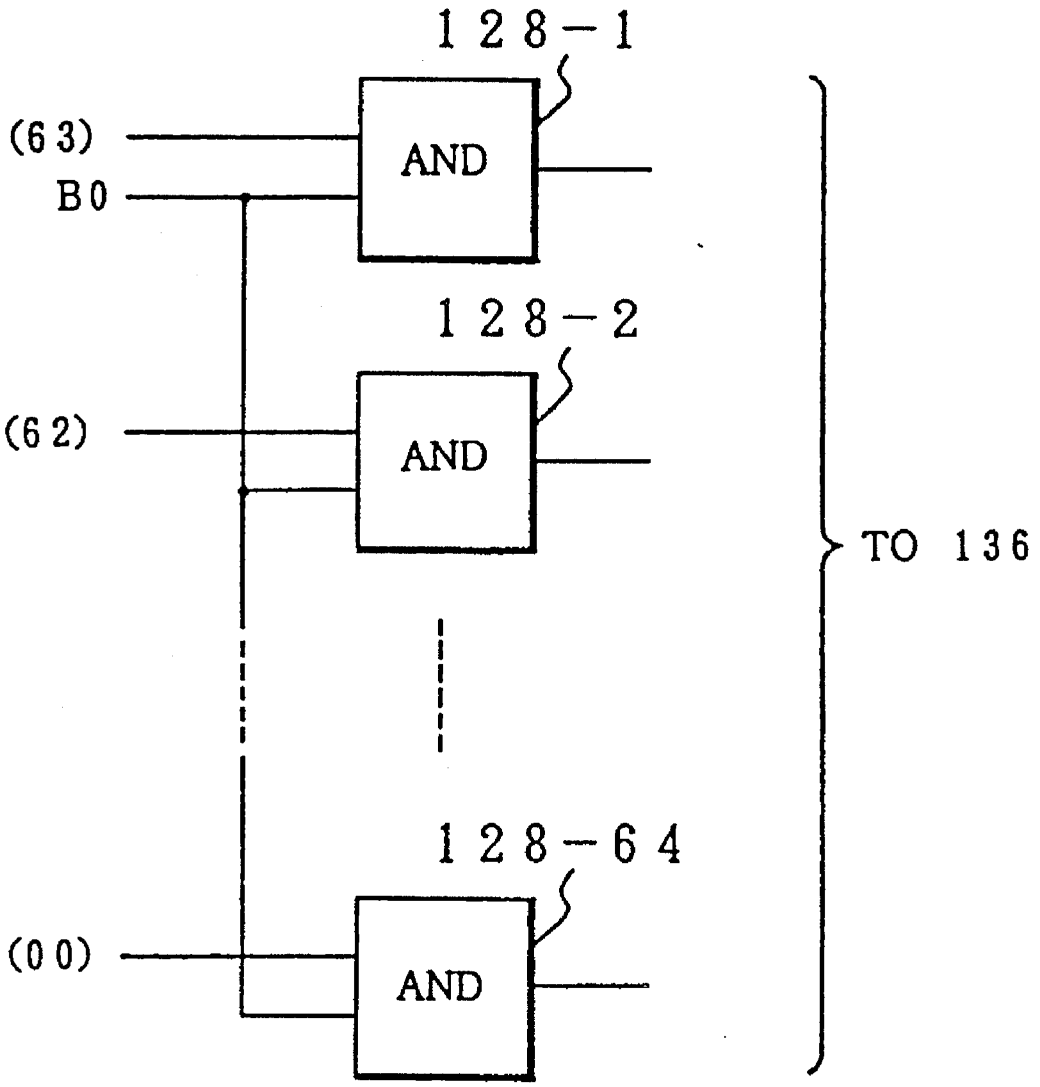
FIG. 22 is a circuit diagram showing the details of an AND circuit at the first stage in FIG. 19.

FIG. 21 shows the details of the first and second shifter sections 98 and 100 shown in FIG. 19. First, the first shifter section 98 comprises AND circuits 128, 130, 132, and 134 and an OR circuit 136. A numeral "64" shown in a frame portion of each circuit indicates the number of gates of the AND gates or OR gates which are actually provided. For example, in case of the AND circuit 128 as an example, the actual circuit has 64 AND gates 128-1 to 128-64 as shown in FIG. 22.

The 64-bit data having an array of the (63) to (00) bits obtained as parallel outputs of four source registers at the front stage is directly supplied in parallel as bit train data D1 to the AND circuit 128 of the first shifter section 98. When the shift control signal (B0) to indicate the shift amount 0 is made effective, the bit train data D1 is directly sent to the second shifter section 10 through the OR circuit 136.

Bit train data (D2) of 64 bits which is deviated in the lower-bit direction by one bit is supplied and connected in parallel to the next AND circuit 130. That is, the most significant bits are set to the (00) bits by shifting the data to the lower bit side by one bit. Subsequently, the bit train data (D2) of 64 bits having an array of the (63) to (01) bits is sent and connected to the AND circuit 130. Bit train data (D3) which was shifted to the lower bit side by two bits is sent to the next AND circuit 132. The bits are sequentially arranged in accordance with the order of (01), (00), and (63) - (02) bits from the upper order bit. Further, bit train data (D4) which was shifted in the lower-bit direction by three bits is sent and connected to the AND circuit 134. In this case, 64 bits are arranged to (02) to (00) and (63) to (03) bits from the upper-order side. When the shift control signal B1, B2, or B3 is made effective, the AND circuit 130, 132, or 134 supplies either one of the bit train data D2, D3, or D4 which was shifted by the input connection to the second shifter section 100 at the next stage through the OR circuit 136.

The second shifter section 100 is divided into four groups in correspondence to the shift outputs (S1) to (S4) and a construction of each group is fundamentally the same as that of the first shifter section 98. Namely, as for the top shift output (S4), the group is constructed by AND circuits 138, 140, 142, and 144 and an OR circuit 170. As for the second shift output (S3), the group is constructed by AND circuits 146, 148, 150 and 152 and an OR circuit 172. As for the third shift output (S2), the group is constructed by AND circuits 154, 156, 158, and 160 and an OR circuit 174. As for the fourth shift output (S1), further, the group is constructed by AND circuits 162, 164, 166, and 168 and an OR circuit 176. As shown by a numeral "16" in the frame portion, the AND circuits and OR circuits provided in the second shifter circuit 100 are actually constructed by 16 AND gates and 16 OR gates.

Each circuit section which was grouped into the shift outputs (S1) to (S4) will now be described. An attention is now paid to the four AND circuits 162, 164, 166, and 168 and the OR circuit 176 which are provided in correspondence to the lowest shift output (S1). The shift output (S1) of the OR circuit 176 has a width of 16 bits of (15) to (00) of the output bit train. First, the first AND circuit 162 is made effective by the shift control signal (B00) to indicate the shift amount 0. The input bit train (15) to (00) from the first shifter section 98 are directly sent and connected to the first AND circuit 162. The next AND circuit 164 is made effective by the shift control signal (B04) to indicate the shift amount 4. The (19) to (04) bits in the output bit train of the input bit train (OR circuit 136) which were shifted in the lower-bit direction by four bits are sent and connected to the AND circuit 164. The third AND circuit 166 is made effective by the shift control signal (B08) to indicate the shift amount 8. The bit positions of (23) to (08) which were shifted in the lower-bit direction by eight bits with respect to the bit train of 64 bits are sent and connected to the AND circuit 166. Further, the fourth AND circuit 168 is made effective by the shift control signal (B12) to indicate the shift amount 12. The bit positions of (27) to (12) which were shifted in the lower-bit direction by eight bits in the input bit train of 64 bits are sent and connected to the AND circuit 168.

Figure 7:
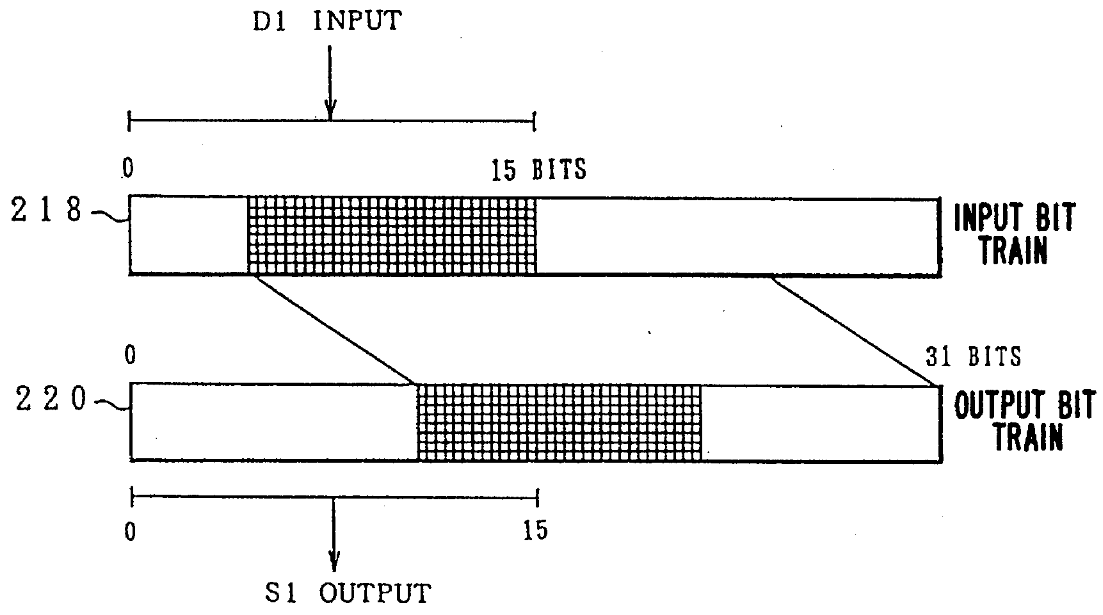
F I G. 7 PRIOR ART
FIG. 7 is an explanatory diagram showing the input of the first source data and its shift output.
Figure 8:
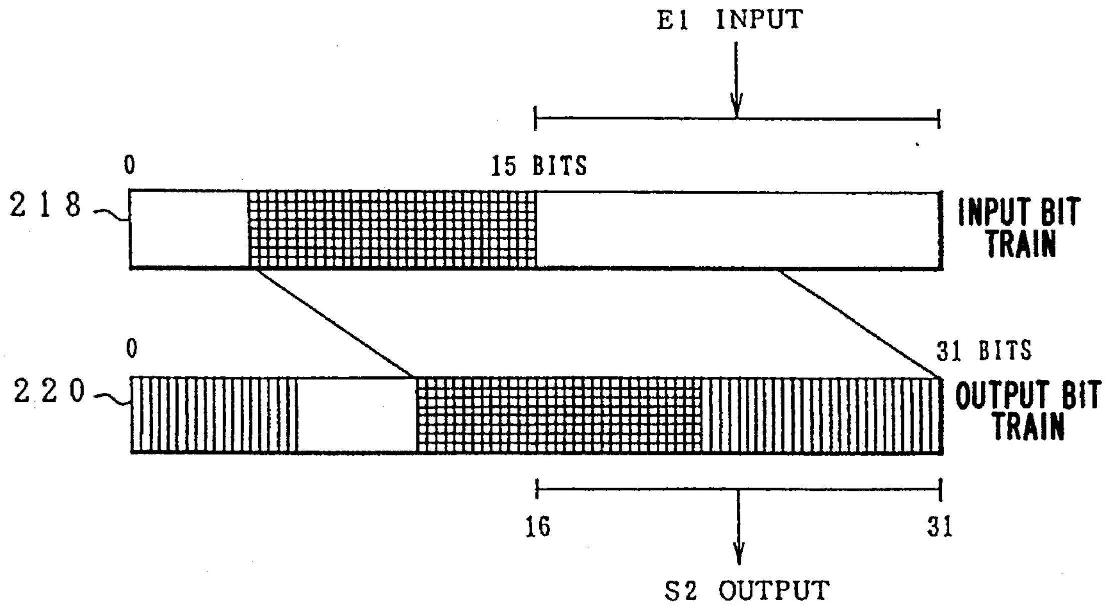
F I G. 8 PRIOR ART
FIG. 8 is an explanatory diagram showing the input of the second source data and its shift output.
Figure 9:
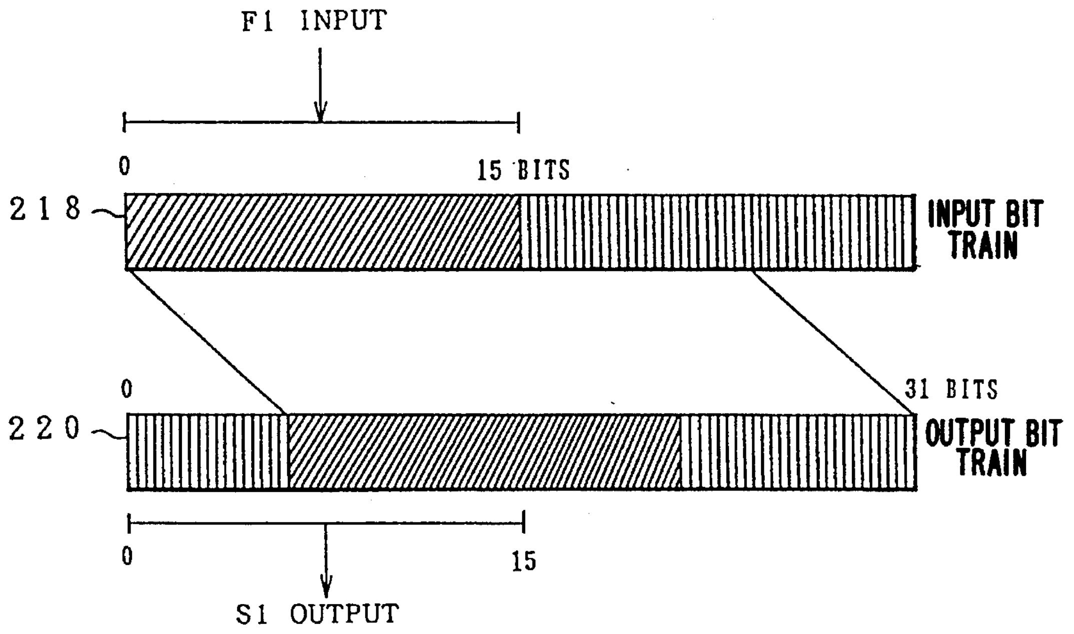
FIG. 9 PRIOR ART
FIG. 9 is an explanatory diagram showing the input of the third source data and its shift output.
Figure 10:
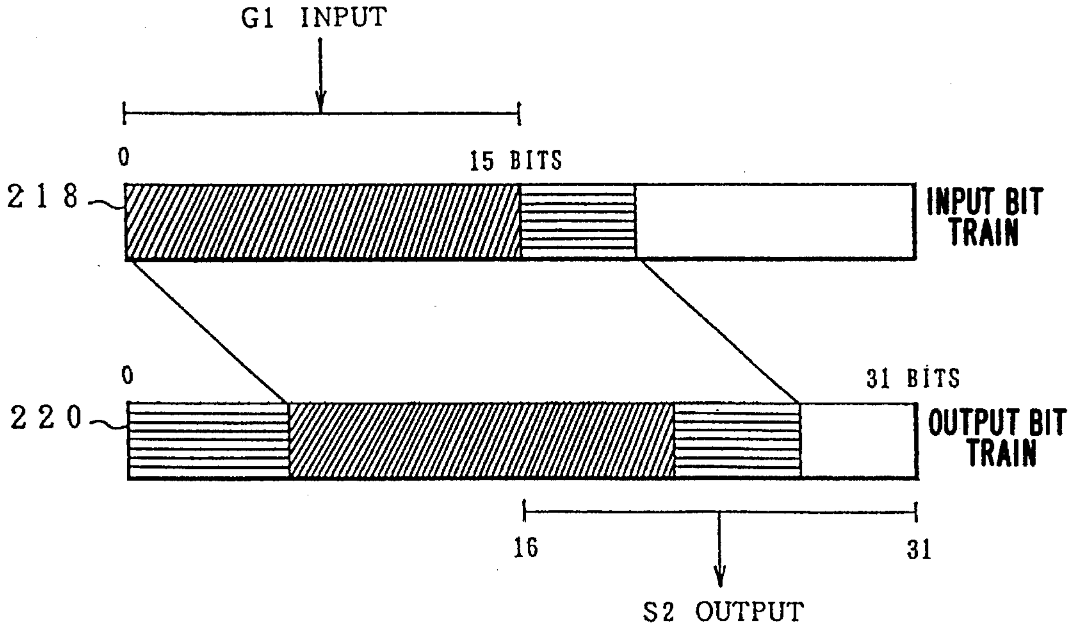
FIG. 10 PRIOR ART
FIG. 10 is an explanatory diagram showing the input of the fourth source data and its shift output.
Figure 11:
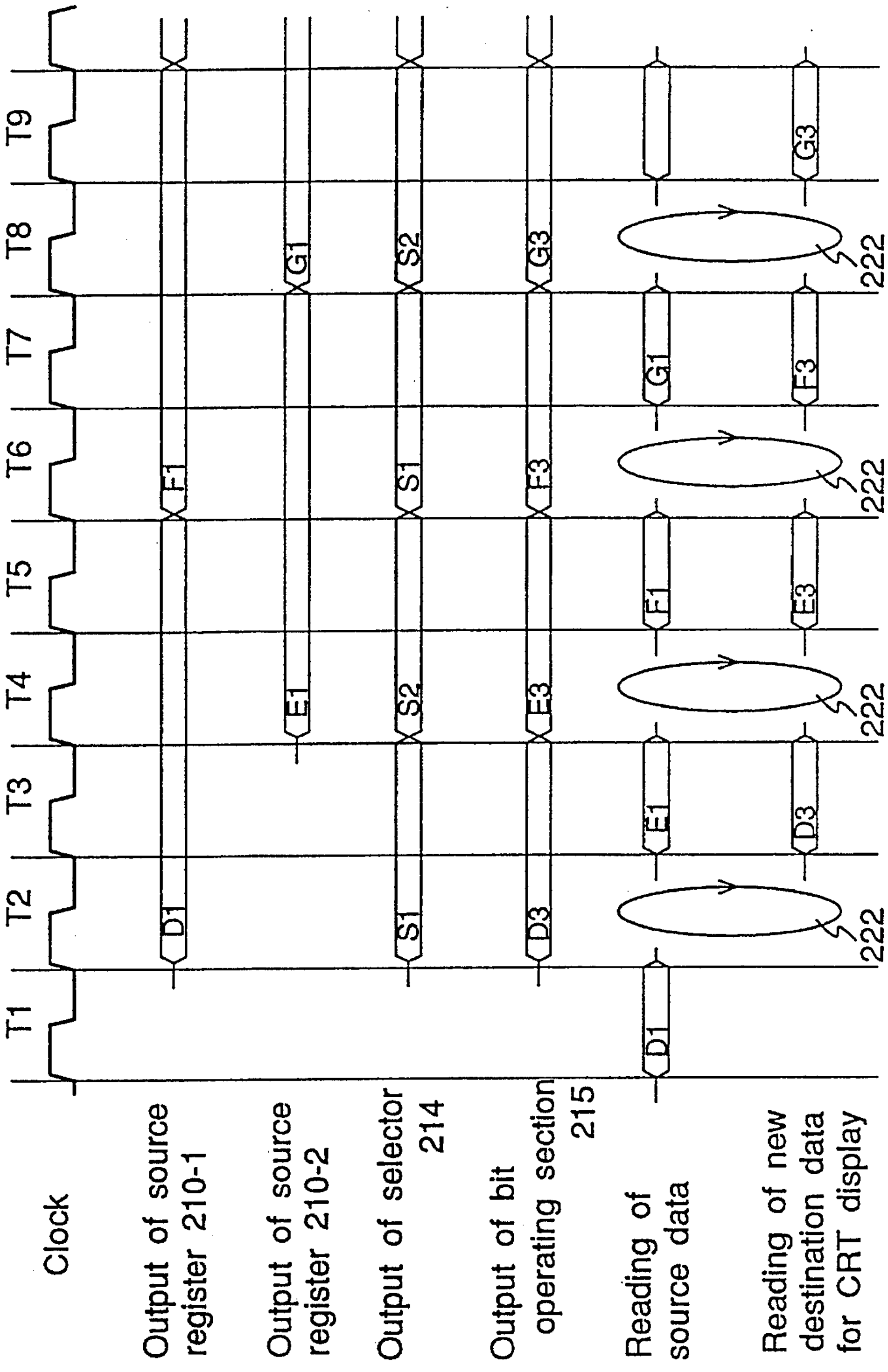
FIG. 11 PRIOR ART
FIG. 11 is a timing chart showing the conventional raster operation in case of moving only the source data.

Such a construction is fundamentally equal with respect to the circuit sections corresponding to the remaining shift outputs (S2) to (S4). The input bit train corresponding to the array of the (16) to (31) bits, (32) to (47) bits, and (48) to (63) bits are set to a shift amount 0. The input bit train which were sequentially shifted by 4 bits, 8 bits, and 12 bits are supplied and connected to the corresponding AND circuits. In the AND circuits 138, 140, 142, and 144 of the most significant shift output (S4), space portions are formed in the case where the input bit train were shifted in the lower-bit direction by the shift amounts 0, 4, 8, and 12. However, the bits which overflowed by the shifting processes on the shift output (S1) side are circulatingly supplied and connected to the space portions. Subsequent to the second shifter section 100, a multiplexer 178 to realize the selector 64 is provided in a manner similar to a multiplexer 180 to realize the selector 62 in FIG. 7. The multiplexer 178 selectively generates either one of the shift outputs (S1) to (S4) each having a width of 16 bits after they were shifted.

FIG. 23 shows the relation between the shift control signals to the first and second shifter sections 98 and 100 shown in FIG. 21 and the shift amounts which are realized by the shifting process of two stages. That is, a final shift amount can be realized by a combination of either one of the control signals (B0 to B3) of the first shifter section and either one of the control signals (B00, B04, B08, B12) of the second shifter section. For example, when the shift control signal (B0) at the first stage is effective, the shift amount 0 is indicated. In the second shifter section, when the control signal (B00) is made effective to likewise indicate the shift amount 0, two shift amounts are added (0+0=0), so that the shift amount 0 is obtained. When the control signal (B1) of the first shifter section is made effective and the control signal (B08) of the second shifter section is made effective, since the shift amount of the first shifter section is equal to 1 and the shift amount of the second shifter section is equal to 8, a shift amount of (1+8=9) is realized. Thus, a shift amount of either one of 0 to 15 corresponding to the width of 16 bits as a boundary unit of the frame memory can be realized by a combination of the control signals of the first and second shifter sections.

FIG. 24 shows the relations among the shift amount, 4-bit shift amount data (A3 - A0), and the 64-bit train which were shifted and are generated from the shifter 60 in correspondence to those data. As for the results of the shifting processes of the 64-bit train as mentioned above, the data having a width of 16 bits at the positions which were physically determined as shown on the lower side is selectively extracted as shift outputs (S1) to (S4).

FIG. 25 shows sixteen kinds of bit arithmetic operations which are executed by the bit operating units 66-1 and 66-2 of FIG. 17. Either one of the bit operating modes can be arbitrarily designated by operational codes (0000) to (1111) of four bits. When the destination data assumes (D) and the source data assumes (S), the contents of the bit arithmetic operations are mainly classified into an OR operation, an AND operation, and an EOR operation. An inverting operation is also included in each of the logic operations. Further, with regard to the AND and OR, there is a case of using the inverted value of either D or S. Further, there is also a mode in which the source data S or destination data D is directly generated or is inverted and generated. In case of the operational code (0000), all of the output data are set to 0. In case of the operational code (1111), all of the output data are set to 1. In this instance, since the memory operations are set to the writing operation (W), the data of all 0 or all 1 is written into the memory. Further, with regard to the 16 kinds of operating modes, either one of the writing operation W or reading operation R for the frame memory can be designated as shown at the right end.

Figure 26:
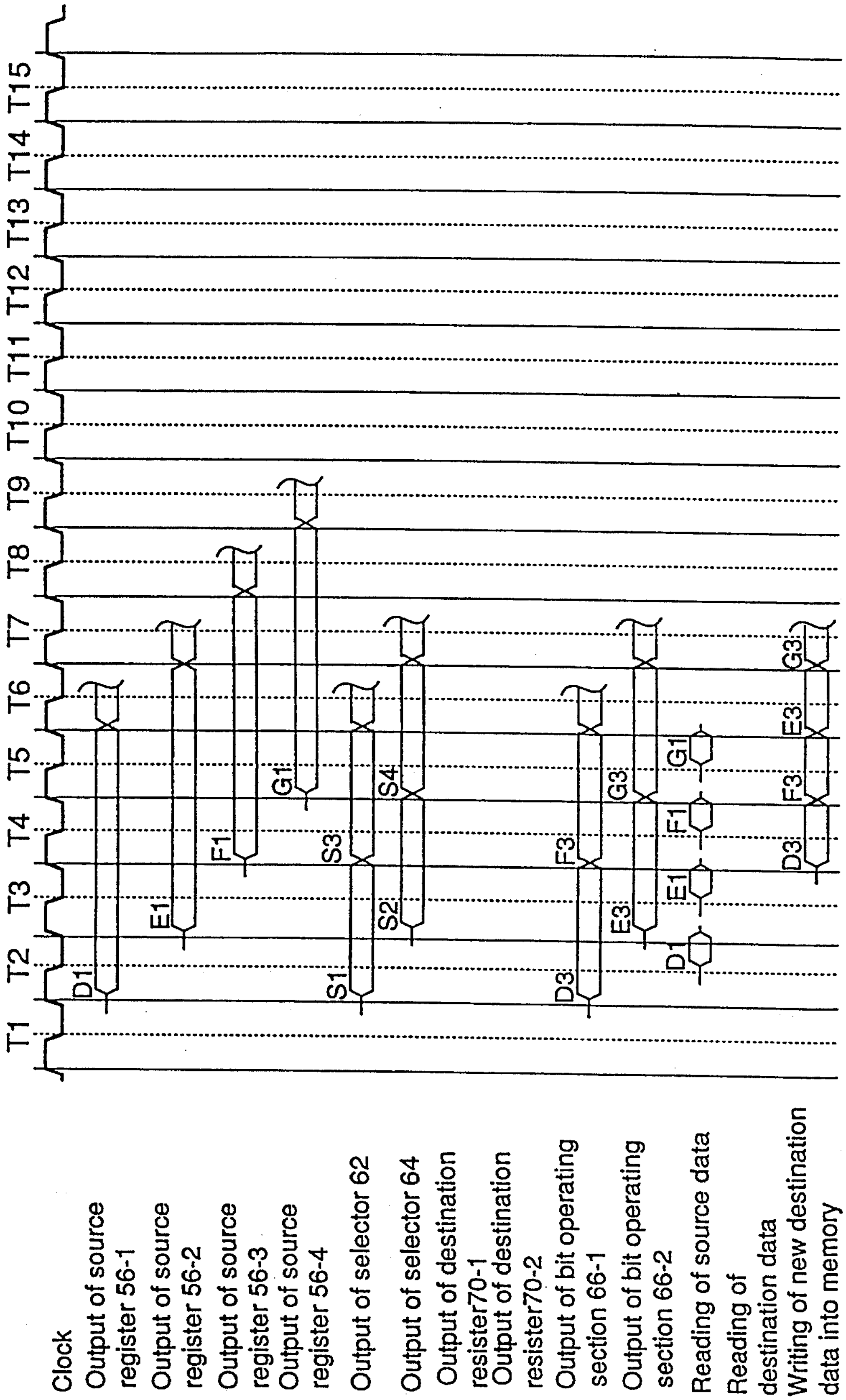
FIG. 26 is a timing chart showing the operation in the case where the source data was sent from a frame memory for transfer to a frame memory for display with respect to the case where no destination data exists.

A timing chart in FIG. 26 shows the raster operation in the transfer mode 1 shown in FIG. 18A. Namely, the transfer mode 1 relates to the case where although the source data is transferred from the transfer frame memory to the display frame memory, no destination data exists on the movement destination side. First, in a T1 cycle, the first source data (D1) is read out from the transfer frame memory and stored into the source register 56-1. In the next T2 cycle, the outputs of the selector 62 and bit operating section 66-1 are selected and the source data (D1) from the source register 56-1 passes through the shifter and is shifted and, after that, the shifted data is supplied as shift data (S1) to the bit operating section 66-1 by the selector 62. In this case, since no destination data exits, only a predetermined bit operation is executed to the source data and the new destination data (D3) is generated as an output value of the bit operating section 66-1 and is written into the display memory on the transfer movement destination side. While the new destination data (D3) is being written into the memory, the next source data (E1) is read in the latter half of the T2 cycle. In a manner similar to the above, similar processes are performed with respect to the second source data (E1), third source data (F1), and fourth source data (G1). From the T3 cycle, the new destination data (D3), (E3), (S3), and (G3) written in the display memory area are sequentially read out and displayed on the CRT.

In the raster operation of the invention, while the new destination data obtained by the bit operating section is being written into the memory, the source data which is processed next can be read in parallel. No idling cycle occurs in the memory access.

Figure 27:
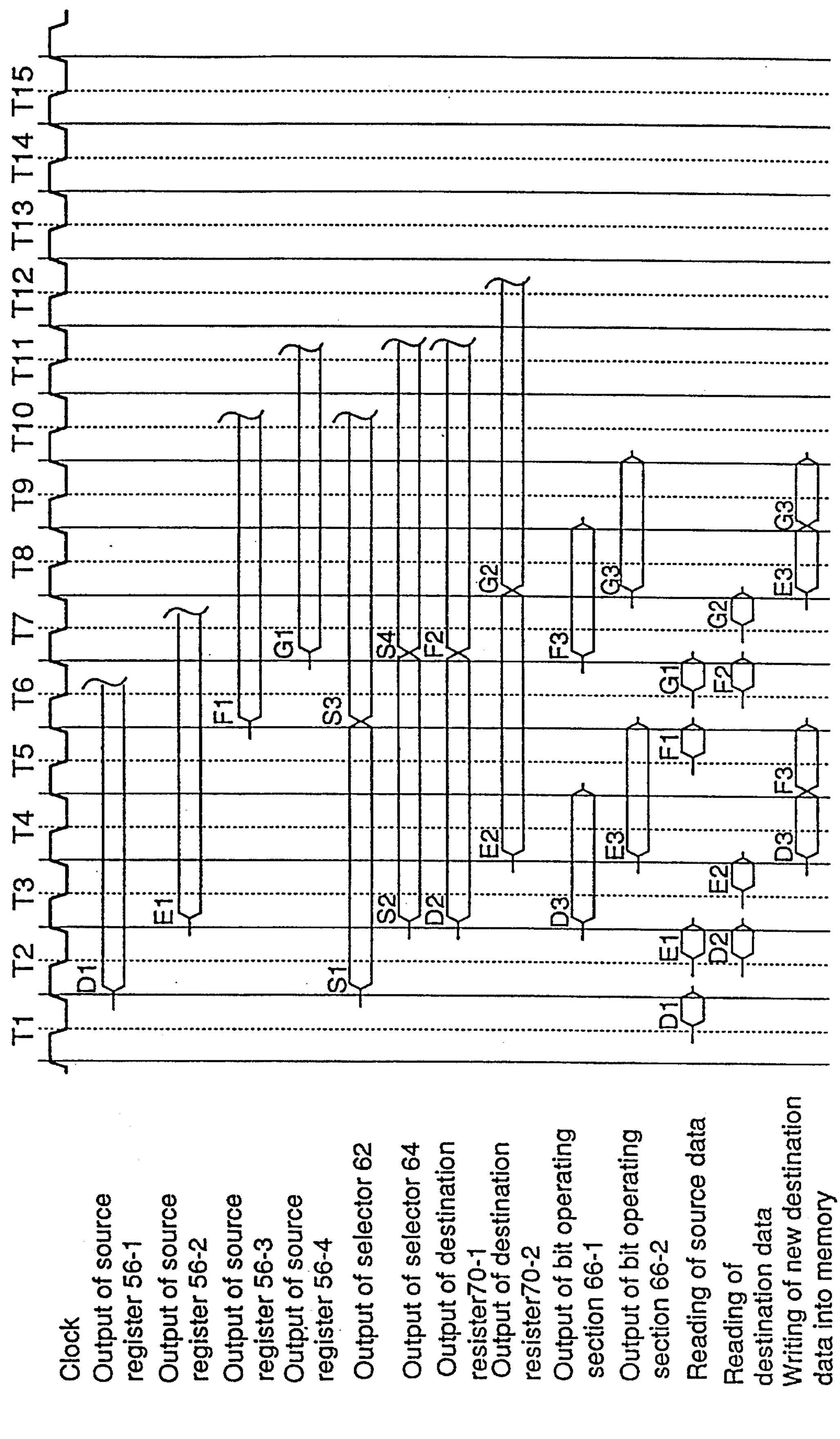
FIG. 27 is a timing chart showing the operation in the case where the source data is sent from the frame memory for transfer to the frame memory for display and is synthesized to the destination data.

A timing chart of FIG. 27 shows the operation of the raster operation in the transfer mode 2 in FIG. 18B. In this case, the destination data exists in the display frame memory on the transfer movement destination side. First, in the T1 cycle, the first source data (D1) is supplied into the source register 56-1. In the next T2 cycle, the destination data (D2) corresponding to the source data (D1) is read out from the display frame memory and stored into the destination register 70-1. In the T2 cycle, further, the second source data (E1) is read out from the transfer frame memory and stored into the source register 56-2. In the T2 cycle, further, the selector 62 selects the source data (D1) of the source register 56-1 and generates as shift data (S1) through the shifter.

In the T3 cycle, the shift data (S1) from the selector 62 and the destination data (D2) from the destination register 70-1 are supplied to the bit operating section 66-1 and a predetermined bit arithmetic operation is executed and the new destination data (D3) is produced and written into the display frame memory. In the T3 cycle during which the new destination data (D3) is being written into the frame memory, the second destination data (E2) is read out from the display frame memory and written into the destination register 70-2. Further, in the T3 cycle, the source data (E1) held in the source register 56-2 is selected by the selector 64 and passes through the shifter 60, so that it is generated as shift data (S2).

In the T4 cycle, the shift data (S2) from the selector 64 and the destination data (E2) from the destination register 70-2 are supplied to the bit operating section 66-2 and the new destination data (E3) is produced and written into the display frame memory. In the T4 cycle, since the new destination data (D3) has already been written in the display frame memory, it is read out from the display frame memory and displayed on the CRT. In the next T5 cycle, the new destination data (E3) written in the memory in the T4 cycle is read out from the memory and displayed on the CRT. In the latter half of the T5 cycle, the third source data (F1) is read out from the transfer frame memory and stored into the source register 56-3. In the T6 cycle and subsequent cycles, the writing and reading operations for the memory are executed on the basis of the source data (F1) and (G1) and the destination data (F2) and (E2) by using the source registers 56-3 and 56-4. In this case, the processes of the selectors 62 and 64, the destination registers 70-1 and 70-2, and the bit operating sections 66-1 and 66-2 are substantially the same as those in the T2 to T5 cycles.

Figure 28:
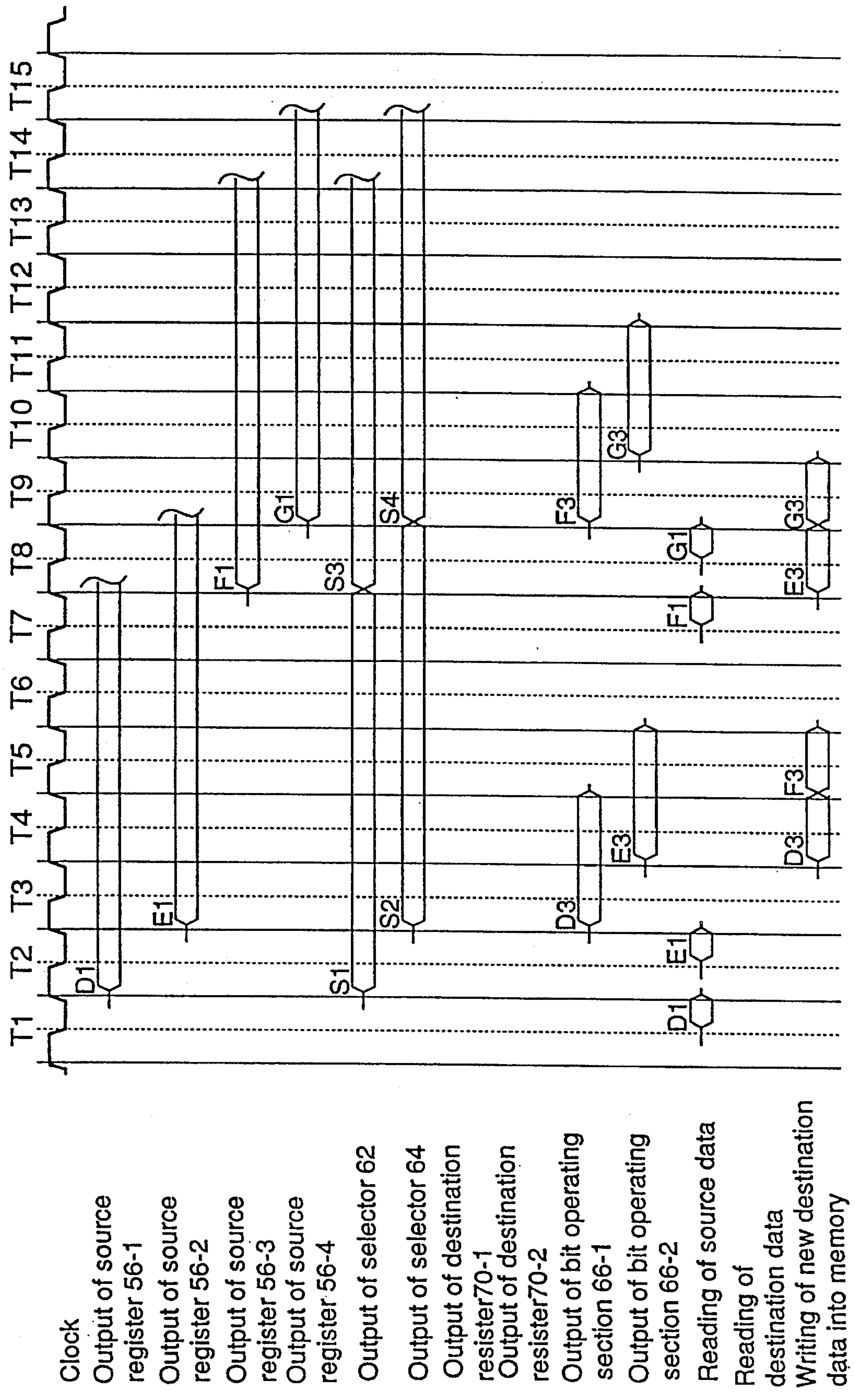
FIG. 28 is a timing chart showing the operation in the case where the source data was moved in the frame memory for display with respect to the case where no destination data exists.

A timing chart of FIG. 28 shows the raster operation in the display frame memory in the transfer mode 3 in FIG. 18C and relates to the case where no destination data exists. First, in the T1 cycle, the source data (D1) is read out and stored into the source register 56-1. In the next T2 cycle, the shift data (S1) which was shifted through the shifter 60 is generated via the selector 62. In the latter half of the T2 cycle, the next source data (E1) is read out and stored into the source register 56-2. In the T3 cycle, since no destination data exists, the new destination data (D3) is generated from the bit operating section 66-1 by the bit arithmetic operation using only the shift data (S1) of the selector 62 and written into the memory. In the T3 cycle, the source data (E1) of the source register 56-2 passes through the shifter and is generated as shift data (S2) via the selector 64. In the T4 cycle, the shift data (S2) from the selector 64 is sent to the bit operating section 66-2 and the new destination data (E3) is produced by a predetermined bit arithmetic operation and written into the memory. In the T4 cycle, the new destination data (D3) stored in all of the cycles is read out and displayed on the CRT. In the T7 to T11 cycles, the raster operation is executed with respect to the third source data (F1) and the fourth source data (G1), and the processes are fundamentally the same as those in the T1 to T5 cycles.

Figure 29:
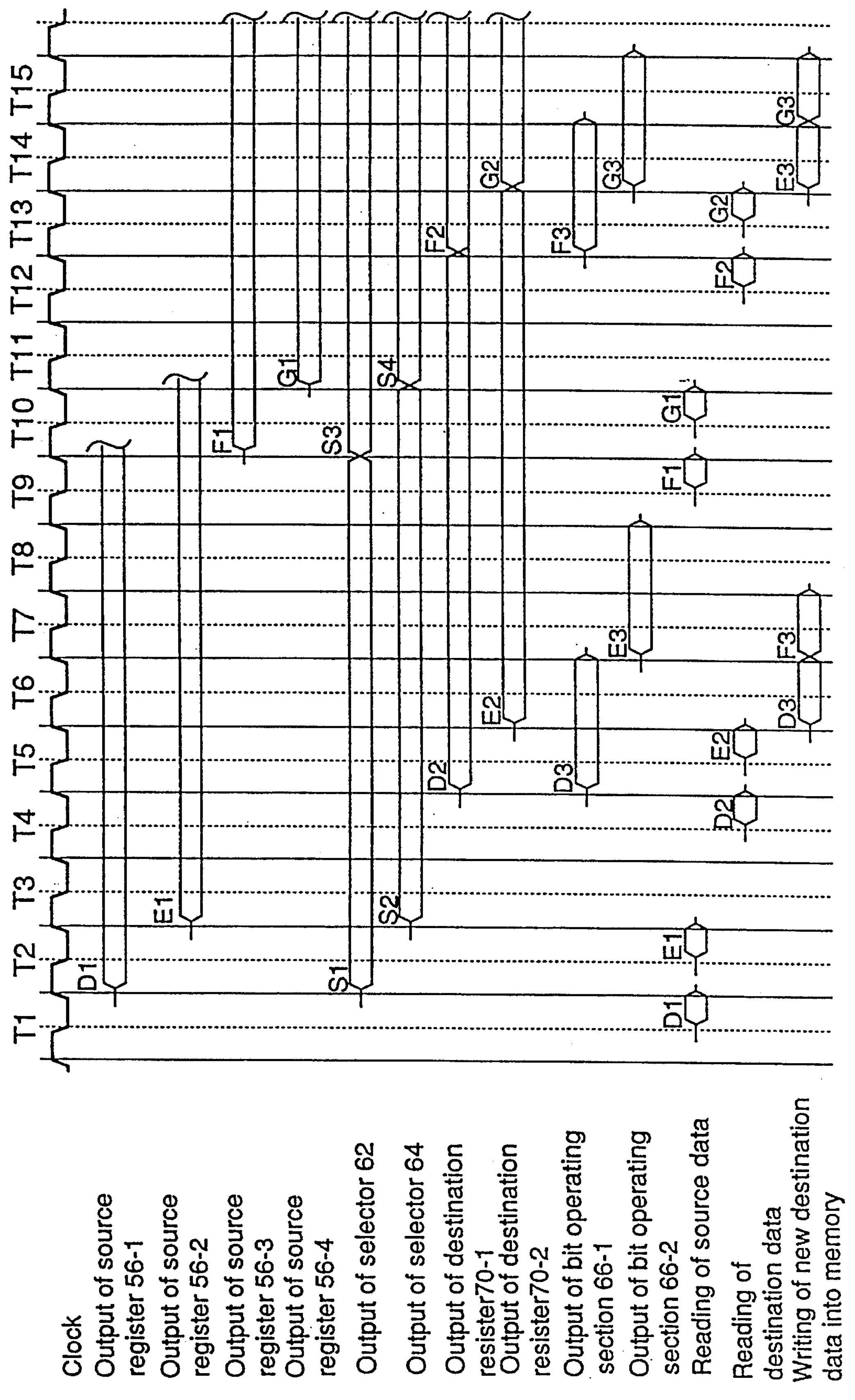
FIG. 29 is a timing chart showing the operation in the case where the source data was moved in the frame memory for display and is synthesized to the destination data.

A timing chart of FIG. 29 shows the operation of the raster operation in the transfer mode 4 in FIG. 18D. In this case, although the raster operation is executed in the display frame area, the destination data exists. The reading operations of the data (D1) and (E1) and the shift output in the T1 to T3 cycles are substantially the same as those in FIG. 28. In the T4 to T7 cycles, the destination data (D2) and (E2) are sequentially read out and bit arithmetic operations are sequentially executed together with the shift data (S1) and (S2) from the selectors 62 and 64 and the new destination data (D3) and (E3) are obtained and written into the memory. After they were written into the memory, the new destination data (D3) and (E3) are read out therefrom and displayed on the CRT. In the next T9 to T15 cycles after the T8 cycle, the source data (F1) and (G1) and the destination data (F2) and (G2) are read out and bit arithmetic operations are executed and the resultant data is read out from or written into the memory. The processes of substantially the same system as that in the T1 to T7 cycles are executed except that the source data (F1 and G1) which was read out from the source registers 56-3 and 56-4 is generated and the destination data (F2 and G2) which was read out from the destination registers 70-1 and 70-2 is generated. The new destination data (F3 and G3) is written into the memory and is read out therefrom and displayed on the CRT.

In the embodiment of the first and second shifter sections 98 and 100 in FIG. 21, there has been explained the circuit construction in the case where the pixel data which is stored in the frame memory is set to the black and white 1-bit data and one boundary unit as a physical processing unit of the frame memory is set to the width of 16 bits. As shown in FIGS. 14 and 15, in case of handling the RGB color pixel data, since one pixel consists of 24 bits, one boundary as a physical processing unit of the frame memory is handled as a width of 16 pixels. As mentioned above, in the case where the boundary unit of the frame memory is set to a width of 16 pixels, since the RGB color pixel data consists of 24 bits, one boundary of the frame memory has a width of 384 bits. In the case where the 24-bit pixel data is processed by the width of 16 pixels, the data lines having a width of 64 bits and a width of 16 bits in FIG. 21 are enlarged by 24 times, and the number of gates constructing the AND circuits and 0R circuits are also increased by 24 times. That is, it is sufficient to construct a circuit while regarding that one bit in FIG. 21 is set to one byte of the 24-bit construction.

The invention is not limited to the above embodiment but many variations and modifications are possible. The invention is also not limited by the numerical values shown in the embodiment.

What is claimed is:

1. A raster operation apparatus comprising:

memory means for storing data corresponding to processing units and comprising source data and destination data, said memory means comprising predetermined memory areas physically divided from each other, each predetermined memory area storing the data corresponding to a processing unit, said predetermined memory areas comprising:

a first memory area storing the source data of one processing unit and, a second memory area storing the destination data of one processing unit;

first register means for receiving and holding the source data of at least four units sequentially read out from said first memory area each of said processing units;

second register means for receiving and holding the destination data of at least two units sequentially read out from said second memory area each of said processing unit and synthesized into said source data;

shift means for receiving in parallel the source data held in said first register means and for producing received source data, for shifting the received source data to coincide with data start positions in a processing unit of said destination data and for producing shifted data, and for generating the shifted data in parallel every processing unit;

at least two bit operating means for fetching the source data of a special processing unit generated from said shift means and the destination data of the second register means corresponding to said source data, for executing a predetermined bit arithmetic operation, and for producing new destination data; and control means for allowing said at least two bit operating means to alternately execute the predetermined bit arithmetic operation by fetching the source data from said shift means and the destination data from said second register means in parallel with supplying and holding of the source data into said first register means and supplying and holding of the destination data into said second register means.

2. An apparatus according to claim 1, wherein said first register means comprises first to fourth storing positions at which the source data comprising first source data (D1), second source data (E1), third source data (F1), and fourth source data (G1) of four units is sequentially received and held, said second register means comprises first and second storing positions which receive and hold the destination data comprising first destination data (D2), second destination data (E2), third destination data (F2), and fourth destination data (G2) of two units, and said control means further comprises;

initial phase processing means for allowing the first source data (D1) to be supplied and held to the first storing position in said first register means and for allowing the first destination data (D2) to be supplied and held to the first storing position of said second register means;

first phase processing means for supplying and holding the second source data (E1) to the second storing position of said first register means and for supplying and holding the second destination data (E2) to the second storing position of said second register means if the first source data (D1) of the first register means is shifted by said shift means and is generated and a bit arithmetic operation is executed together with the first destination data (D2) of said second register means by one of said bit operating means, in parallel with said bit operation;

second phase processing means for supplying and holding the third source data (F1) to the third storing position of said first register means and for supplying and holding the third destination data (F2) to the first storing position of said second register means if the second data (E1) of the second register means is shifted by said shift means and is generated and a bit arithmetic operation is executed together with the second destination data (E2) of said second register means by the other one of the bit operating means, in parallel with said bit operation;

third phase processing means for supplying and holding the fourth source data (G1) to the fourth storing position of said first register means and for supplying and holding the fourth destination data (G2) to the second storing position of the second register means if the third source data (F1) of said register means is shifted by said shift means and is generated and a bit arithmetic operation is executed together with the third destination data (F2) of the second register means by one of said bit operating means, in parallel with said bit operation; and fourth phase processing means for supplying and holding the first source data (D1) to the first storing position of the first register means and for supplying and holding the first destination data (D2) to the first storing position of said second register means if the fourth source data (G1) of the second register means is shifted by said shift means and is generated and a bit arithmetic operation is executed together with the fourth destination data (G2) of the second register means by one of said bit operating means, in parallel with said bit operation.

3. An apparatus according to claim 1, wherein said shift means shifts the source data separately at two stages and generates the shifted data.

4. An apparatus according to claim 3, wherein wherein a maximum shift amount determined by a number of data of one processing unit of the source data is set to (m+n), and wherein said shift means comprises:

first shift means for selectively generating one of shifted data trains while shifting a data position of the source data by every 0, 1, . . . , (m−1) data trains;

second shift means for receiving the shifted data train selected and generated by said first shift means, shifting the data on an (m) unit basis every 0, (1×m), . . . , ((n−1)×m) data trains, and selectively generating one of the shifted data trains; and shift control means for controlling selective generation of the data trains by said first and second shift means based on a shift amount of said source data.

5. An apparatus according to claim 4, wherein if the maximum shift amount (m+n)=16 determined by a number (16) of data of said source data is divided into two shift amounts by setting m=4 and n=4 and is shifted by two stages, said first shift means shifts received 64 data trains of the source data every 0, 1, 2, and 3 data trains and selectively generates either one of the shifted data trains, and said second shift means shifts the received 64 data trains selected and generated from the first shift means on a four unit basis every 0, 4, 8, and 12 data trains and selectively generates one of the shifted data trains.

6. An apparatus according to claim 5, wherein in the case where a binary number indicative of the shift amount of the source data is set to (A3, A2, A1, A0), said shift control means decodes said binary number and obtains a first decoded output indicative of either one of the shift amounts 0, 1, 2, and 3 of a decimal number and a second decoded output indicative of either one of the shift amounts 0, 4, 8, and 12, allows the first shift means to select the data train of the corresponding shift amount by said first decoded output, and allows the second shift means to select the data train of the corresponding shift amount by said second decoded output.

7. An apparatus according to any one of claim 1, wherein one processing unit of said source data and said destination data is set to a predetermined number of pixel data.

8. An apparatus according to claim 7, wherein said pixel data is constructed by a plurality of bits indicative of a color component.

9. An apparatus according to any one of claim 1, wherein one processing unit of said source data and said destination data is set to data of a predetermined number of bits.

10. An apparatus according to claim 1, wherein said first memory area is an area in a frame memory for transfer and said second memory area is an area in a frame memory for display.

11. An apparatus according to claim 1, wherein both of said first and second memory areas are areas in a frame memory for transfer.

12. An apparatus according to claim 1, wherein both of said first and second memory areas are areas in a frame memory for display.

13. An apparatus according to claim 1, wherein said bit operating means executes either one of the AND of said source data and said destination data, the inverted AND, the OR, the inverted OR, the exclusive OR, and the inverted exclusive OR.

14. An apparatus according to claim 13, wherein said bit operating means executes arithmetic operations of the AND and OR of said source data and said destination data by using the inverted value of either one of said source data and said destination data.

15. An apparatus according to claim 13, wherein said bit operating means writes a calculated bit train into said second memory area.

16. An apparatus according to claim 13, wherein said bit operating means generates a calculated bit train as read data.

* * * * *

UNITED STATES PATENT AND TRADEMARK OFFICE
CERTIFICATE OF CORRECTION

PATENT NO. : 5,479,605

DATED : December 26, 1995

INVENTOR(S) : Hideki Saitoh

Figure 1:
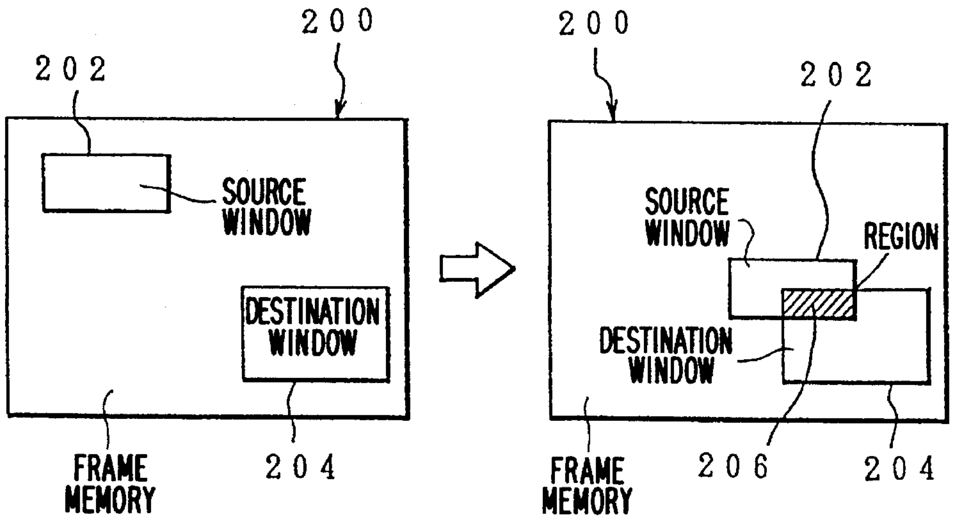
FIG. 1 PRIOR ART
FIG. 1 is an explanatory diagram of the window synthesis in a frame memory by the conventional raster operation.
Figure 2:
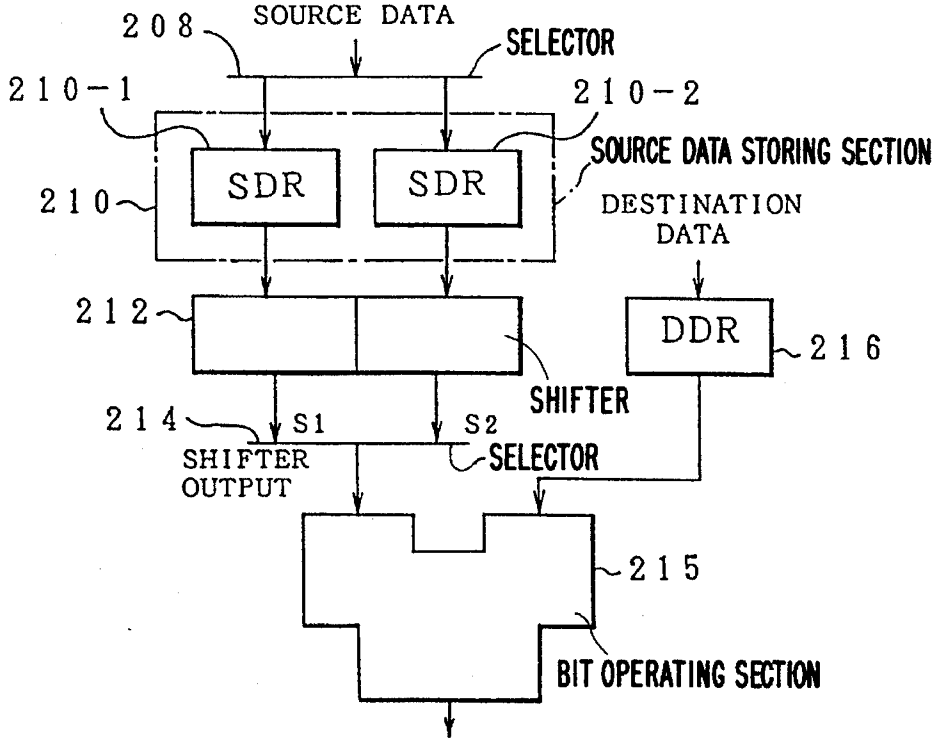
FIG. 2 PRIOR ART
FIG. 2 is a block diagram showing a conventional raster operation apparatus.
Figure 3:
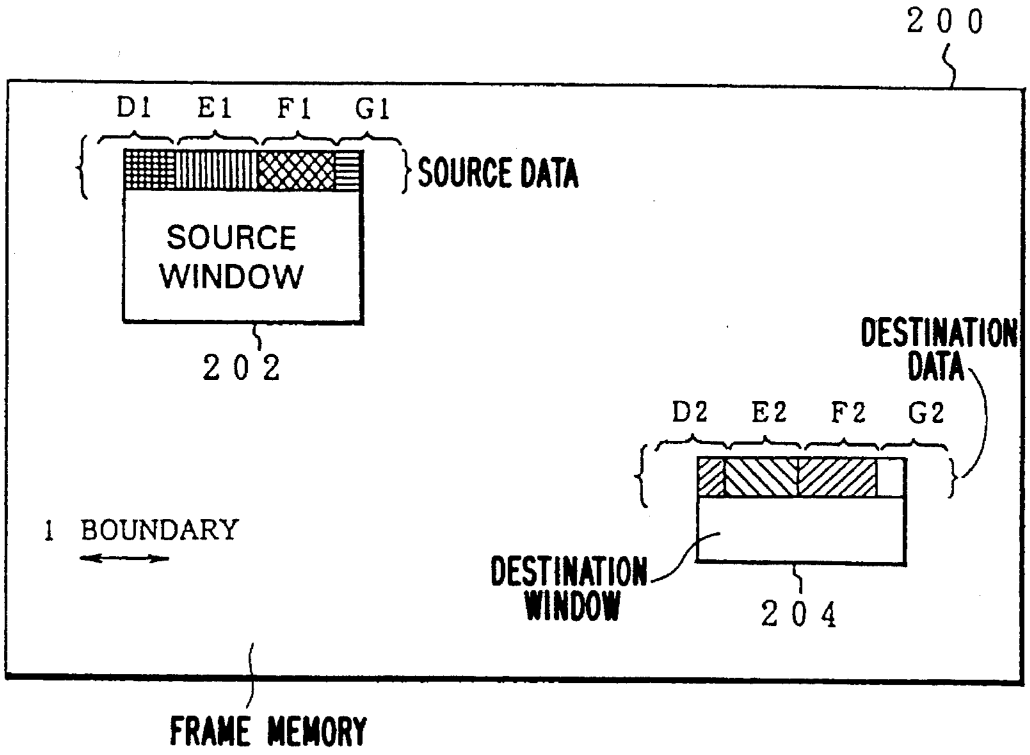
FIG. 3 PRIOR ART
FIG. 3 is an explanatory diagram showing the relations among the boundary as a processing unit of the frame memory, the source data, and the destination data.
Figure 4:
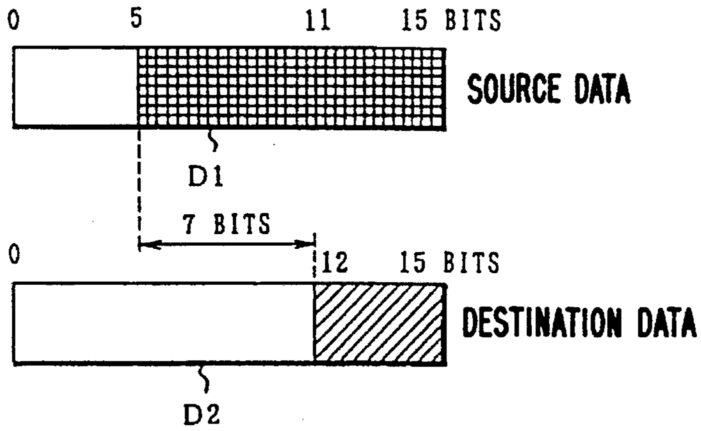
FIG. 4 PRIOR ART
FIG. 4 is an explanatory diagram in the case where the source data read out on a boundary unit basis is synthesized as it is to the destination data.
Figure 5A:
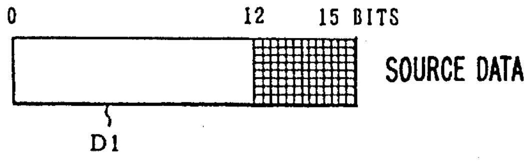
F I G. 5A PRIOR ART
FIG. 5 is an explanatory diagram in the case where the source data read out on a boundary unit basis is shifted and the bit positions are matched and, after that, the shift source data is synthesized to the destination data.
Figure 5B:
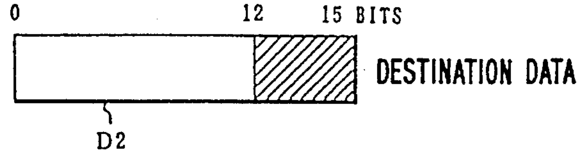
F I G. 5B PRIOR ART
Figure 6:
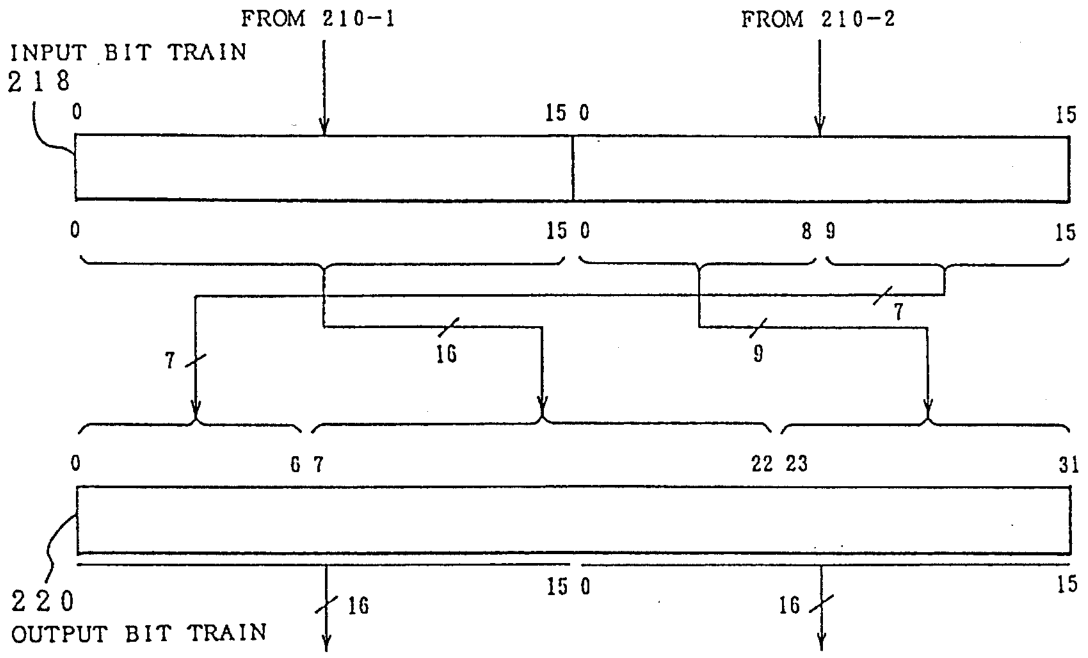
F I G. 6 PRIOR ART
FIG. 6 is an explanatory diagram showing a function of a shifter in which a connecting state to shift the source data by seven bits has been established.

It is certified that error appears in the above-indentified patent and that said Letters Patent is hereby corrected as shown below:

Column 2, line 18, change "FIG. 5" to --FIGS. 5A and 5B--;

line 52, change "has" to --was--.

Column 6, line 54, change "FIG. 5 is an" to --FIGS. 5A and 5B are--, and change "diagram" to --diagrams--.

Figure 20A:
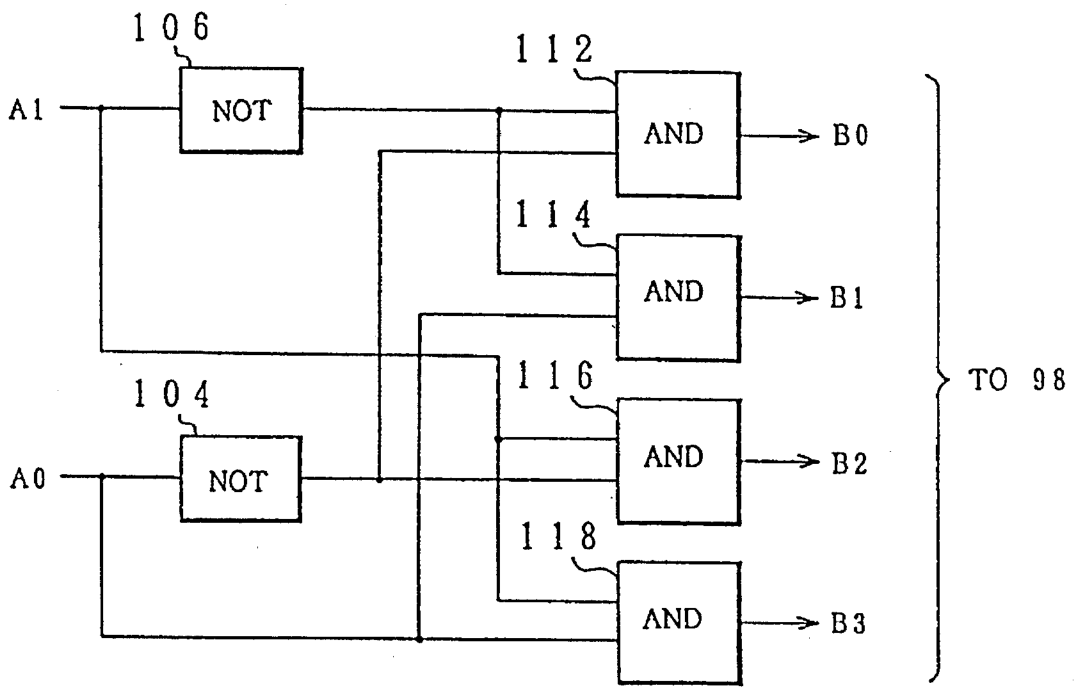
FIG. 20 is a circuit block diagram showing an embodiment of a shift control section in FIG. 19.
Figure 20B:
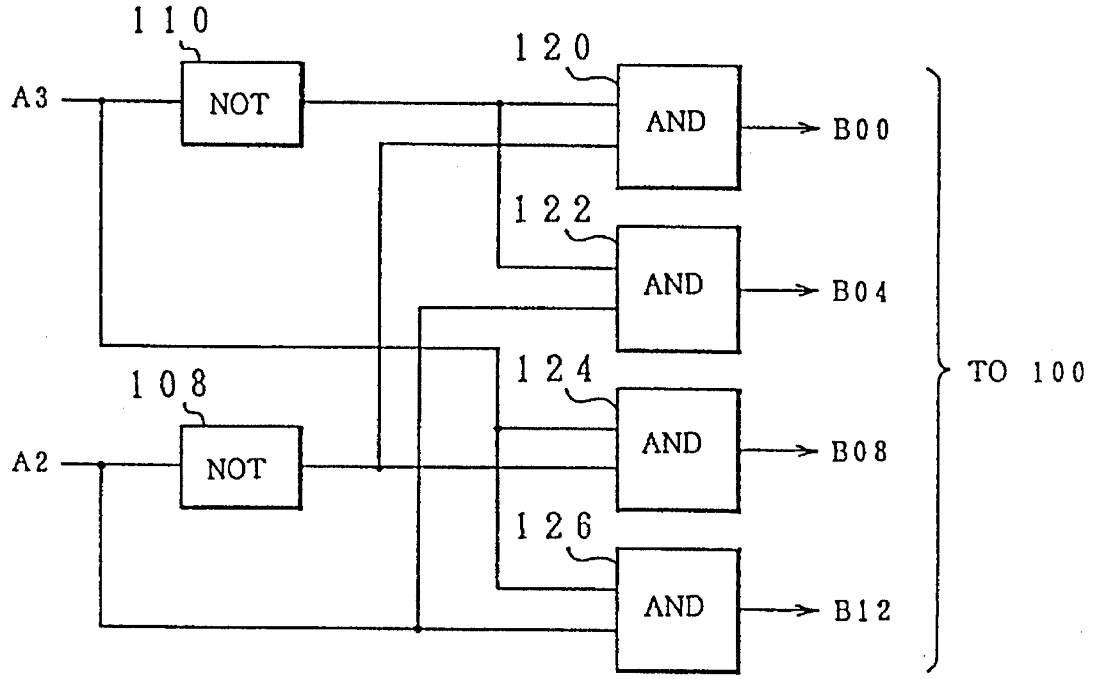

Column 7, line 21, change "FIG. 20 is a circuit block diagram" to --FIGS. 20A and 20B are circuit block diagrams--.

UNITED STATES PATENT AND TRADEMARK OFFICE
CERTIFICATE OF CORRECTION

PATENT NO. : 5,479,605

DATED : December 26, 1995

INVENTOR(S) : Hideki Saitoh

It is certified that error appears in the above-indentified patent and that said Letters Patent is hereby corrected as shown below:

Column 12, line 22, change "FIG. 20 shows" to to --FIGS. 20A and 20B show--.

Column 18, line 49, delete "wherein" (second occurrence).

Signed and Sealed this

Thirtieth Day of April, 1996

Attest:

BRUCE LEHMAN

Attesting Officer

Commissioner of Patents and Trademarks